US010015184B1

(12) United States Patent
Bell

(10) Patent No.: US 10,015,184 B1
(45) Date of Patent: Jul. 3, 2018

(54) EMULATING REGULATING DEVICE TO DETECT UTILITY GRID INTRUSIONS

(71) Applicant: Utilidata, Inc., Providence, RI (US)

(72) Inventor: David Gordon Bell, Spokane, WA (US)

(73) Assignee: UTILIDATA, INC., Providence, RI (US)

( * ) Notice: Subject to any disclaimer, the term of this patent is extended or adjusted under 35 U.S.C. 154(b) by 0 days.

(21) Appl. No.: 15/696,602

(22) Filed: Sep. 6, 2017

Related U.S. Application Data

(60) Provisional application No. 62/539,841, filed on Aug. 1, 2017.

(51) Int. Cl.
*H04L 29/06* (2006.01)
*G01R 19/25* (2006.01)

(52) U.S. Cl.
CPC ...... *H04L 63/1425* (2013.01); *G01R 19/2513* (2013.01); *H04L 63/145* (2013.01)

(58) Field of Classification Search
CPC .................................................. H04L 63/1425
See application file for complete search history.

(56) References Cited

U.S. PATENT DOCUMENTS

| 9,330,563 | B2 * | 5/2016 | Rhoads | G08C 19/12 |
| 2011/0021186 | A1 * | 1/2011 | Fischer | H01Q 1/246 |
| | | | | 455/424 |
| 2014/0277814 | A1 * | 9/2014 | Hall | H02J 3/14 |
| | | | | 700/298 |

FOREIGN PATENT DOCUMENTS

GB  2506188 A * 3/2014 ............. G01D 4/002

* cited by examiner

*Primary Examiner* — Shawnchoy Rahman
(74) *Attorney, Agent, or Firm* — Foley & Lardner LLP

(57) ABSTRACT

Systems and methods of detecting an attack in a utility grid are described. An anomaly detector identifies a first indication of signal samples used by a controller to adjust a voltage level at a load terminal during a first time interval, and a first indication of voltage levels at the load terminal of the controller. The anomaly detector identifies a regulator emulation model ("REM") for the controller. The anomaly detector receives a second indication of signal samples used by the controller during a second time interval, and a second indication of a voltage level at the load terminal. The anomaly detector detects a level of conformance with the REM based on a comparison of the second indication of the voltage levels with a voltage level determined by inputting the second indication of the signal samples into the REM. The anomaly detector provides a notification indicating an anomaly with the controller.

30 Claims, 11 Drawing Sheets

EMULATING REGULATING DEVICE TO DETECT UTILITY GRID INTRUSIONS

CROSS-REFERENCES TO RELATED APPLICATIONS

This application claims priority to, and the benefit of, U.S. Provisional Patent Application No. 62/539,841, filed Aug. 1, 2017, which is incorporated herein by reference in its entirety.

FIELD OF THE DISCLOSURE

This disclosure generally relates to systems and methods of emulating a regulating device to detect utility grid intrusions. In particular, the systems and methods can use a behavioral model of the regulating device to detect device behavior anomalies.

BACKGROUND

A utility grid can include an interconnected network for delivering a utility (e.g., electricity, power, energy, water, gas, natural gas, oil, phone, Internet, or communications bandwidth) from a supplier of the utility to a consumer of the utility. Utility grids may include or interact, interface or communicate with one or more devices or assets that facilitate generating the utility, controlling an aspect of the utility grid, delivering the utility from one point to another point in the utility grid, managing the utility grid, monitoring the utility grid, or tracking the consumption of the utility. These devices can include digital computation devices, systems, processors, or other circuitry configured to facilitate an aspect of the utility grid.

Digital devices may be susceptible to malicious viruses, attacks, or exploits that can affect their function or performance. For example, a digital asset in an electrical grid may operate in an abnormal manner causing disturbances to energy delivery conditions in the electric grid. These disturbances may result in service interruptions or may even damage an asset or device of the electrical grid. It may be challenging to detect malicious attacks in a utility grid, thus making it challenging to determine the cause of disturbances in the utility grid.

BRIEF SUMMARY OF THE DISCLOSURE

Systems and methods of the present disclosure are directed to detecting anomalies in utility grid assets. More specifically, the systems and methods provide an anomaly detector that can emulate regulating device control actions to detect an anomaly based on a level of conformance of the regulating device's observed behavior with a regulator emulation model ("REM") established for the regulating device.

The anomaly detector can utilize one or more techniques to characterize the consumption of electrical energy by connected customers and the effects this consumption has on devices and structures of the utility grid. For example, the anomaly detector can characterize the consumption and the effects of the consumption on the operating conditions of the utility grid by modeling such consumption as stochastic processes. The consumption can be characterized as stochastic processes for the purposes of behavioral analysis, process observation and measurement, quantitative forecasting, grid control, and optimization of delivery and consumption efficiencies.

The anomaly detector can identify consumption and control behaviors by using estimators derived from signals obtained from grid instrumentation (e.g., grid metering devices) and grid control devices (e.g., voltage controller or tap regulator). The anomaly detector can use properties of such estimators in order to identify nominal behaviors given certain conditions that influence these behaviors. The anomaly detector can also use properties of these estimators to identify unusual, abnormal, or otherwise unexpected behaviors of the consumption processes.

For example, the properties of grid metering signals observed by digital instrumentation devices of the utility grid are based on the behavior of consumption of electricity or power by consumer sites. The properties of the grid metering signals can be further based on the actions taken by grid control devices in response to the behavior of the consumption. Consumption or consumer behavior can be driven by seasonal variation, actual daily/hourly weather conditions, typical daily activity associated with employment or recreation, social events, and holiday activities. In each case, the consequent demand processes impressed upon the electric power grid can cause the grid control devices to respond in predictable ways. However, when grid control devices do not respond to consumption behavior in a predictable or expected manner, the unexpected or deviant response can be identified as anomalous.

The anomaly detector can use estimators derived from grid metering signals obtained from grid instrumentation or grid control devices to identify the action of a controller in the distribution grid as operated by automatic control systems, or interactions between the consumption processes and the grid control devices and systems. Thus, the anomaly detector can identify an anomaly and further identify an attack on a grid computation devices caused by malicious code introduced into a digital computation device of the grid.

At least one aspect is directed to a method of detecting an anomaly in a utility grid. The method can be performed by an anomaly detector that is remote from a controller of a utility grid. The method can include the anomaly detector identifying a first indication of one or more signal samples used by the controller to adjust a voltage level at a load terminal during a first time interval. The anomaly detector can also identify a first indication of one or more voltage levels at the load terminal of the controller during the first time interval. The method can include the anomaly detector identifying a REM for the voltage regulator controller based on the first indication of the one or more signal samples and the first indication of the one or more voltage levels for the first time interval. The voltage regulator controller can operate the mechanisms on the voltage regulators and load tap changers. The method can include the anomaly detector receiving a second indication of one or more signal samples used by the controller during a second time interval. The anomaly detector can receive a second indication of a voltage level at the load terminal of the controller during the second time interval. The method can include the anomaly detector detecting a level of conformance with the REM based on a comparison of the second indication of the voltage level with a modelled voltage level determined by inputting the second indication of the one or more signal samples into the model established by the anomaly detector. The method can include the anomaly detector providing, responsive to the level of conformance between the controller behavior anticipated by the REM and the observed controller behavior, a notification indicating an anomaly associated with the controller.

In some implementations, the first indication of the one or more signal samples received by the anomaly detector can be a subset of the one or more signal samples used by the controller to adjust the voltage level at the load terminal during the first time interval. The one or more signal samples used by the controller during the first time interval can be sampled at a greater rate than the first indication of the one or more signal samples received by the anomaly detector. The anomaly detector can apply an inferential technique to the first indication of the one or more signal samples used by the controller during the first time interval to generate the model.

The method can include the anomaly detector detecting a change in the voltage level at the load terminal during the first time interval as compared to the voltage level at the load terminal during the first time interval. The anomaly detector can set a threshold value for the REM based on the first indication of the one or more voltage levels. The anomaly detector can detect the change in the voltage level based on a transmission received from the controller indicating a position change of a tap setting of the controller. The anomaly detector can apply an edge estimator technique to the indication of the one or more voltage levels during the first time interval to detect at least one of a position, a magnitude, or a variance of the change in the voltage level.

The method can include the anomaly detector detecting a second level of conformance with the REM based on a second comparison of a third indication of one or more voltage levels with a second voltage level determined by inputting a third indication of one or more signal samples into the REM established by the anomaly detector. The anomaly detector can update the REM responsive to the second level of conformance greater than a threshold indicating convergence of the REM.

In some cases, the second indication of the one or more voltage levels can indicate an increase in the tap setting. The method can include the anomaly detector establishing a duration of a countdown timer and a voltage threshold for the REM. The anomaly detector can identify that the second indication of the one or more signal samples exceeds the voltage threshold for the REM. The anomaly detector can determine, based on the REM, that the modelled voltage level determined by inputting the second indication of the one or more signal samples into the REM established by the anomaly detector corresponds to a decrease in a tap setting. The anomaly detector can detect the level of conformance with the REM below a threshold based on the comparison of the second indication of the voltage level with the modelled voltage level determined based on the REM.

The anomaly detector can classify the anomaly based on the REM. For example, the anomaly detector can classify the anomaly based on the known behaviors specified in the REM. The anomaly detector can provide a classification of the anomaly with the notification of the anomaly.

Another aspect is directed to a system to detect an anomaly in a utility grid. The system can include an anomaly detector executing on one or more processors. The one or more processors can be remote from a controller of a utility grid. The anomaly detector can include or execute a REM generator and a comparator. The REM generator can identify a first indication of one or more signal samples used by the controller to adjust a voltage level at a load terminal during a first time interval. The REM generator can identify a first indication of one or more voltage levels at the load terminal of the controller during the first time interval. The REM generator can identify a REM for the controller based on the first indication of the one or more signal samples and the first indication of the one or more voltage levels for the first time interval. The comparator can receive a second indication of one or more signal samples used by the controller during a second time interval. The comparator can receive a second indication of a voltage level at the load terminal of the controller during the second time interval. The comparator can detect a level of conformance with the REM based on a comparison of the second indication of the voltage level with a modelled voltage level determined by inputting the second indication of the one or more signal samples into the REM established by the anomaly detector. The comparator can provide, responsive to the level of conformance, a notification indicating an anomaly associated with the controller.

The first indication of the one or more signal samples received by the anomaly detector can be a subset of the one or more signal samples used by the controller to adjust the voltage level at the load terminal during the first time interval. The one or more signal samples used by the controller during the first time interval can be sampled at a greater rate than the first indication of the one or more signal samples received by the anomaly detector. In some cases, the anomaly detector can apply an inferential technique to the first indication of the one or more signal samples used by the controller during the first time interval to generate the REM.

The anomaly detector can detect a change in the voltage level at the load terminal during the first time interval as compared to the voltage level at the load terminal during the first time interval. The anomaly detector can set a threshold value for the REM based on the first indication of the one or more voltage levels. The anomaly detector can detect the change in the voltage level based on a transmission received from the controller indicating a position change of a tap setting of the controller. The anomaly detector can apply an edge estimation technique to the indication of the one or more voltage levels during the first time interval to detect at least one of a position, a magnitude or a variance of the change in the voltage level.

In some cases, the anomaly detector can detect a second level of conformance with the REM based on a second comparison of a third indication of one or more voltage levels with a second voltage level determined by inputting a third indication of one or more signal samples into the REM established by the anomaly detector. The anomaly detector can update the REM responsive to the second level of conformance greater than a threshold indicating convergence with the REM.

The anomaly detector can establish a duration of a countdown timer and a voltage threshold for the REM. The second indication of the one or more voltage levels can indicate an increase in the tap setting, and the anomaly detector can identify that the second indication of the one or more signal samples exceeds the voltage threshold for the REM. The anomaly detector can determine, based on the REM, that the voltage level determined by inputting the second indication of the one or more signal samples into the REM established by the anomaly detector corresponds to a decrease in a tap setting. The anomaly detector can detect the level of conformance with the REM below a threshold based on the comparison of the second indication of the one or more voltage levels with the voltage level determined based on the REM.

The anomaly detector can classify the anomaly based on criteria corresponding to classes of anomalies. The anomaly detector can provide a classification of the anomaly with the notification of the anomaly.

BRIEF DESCRIPTION OF THE FIGURES

The details of one or more embodiments of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
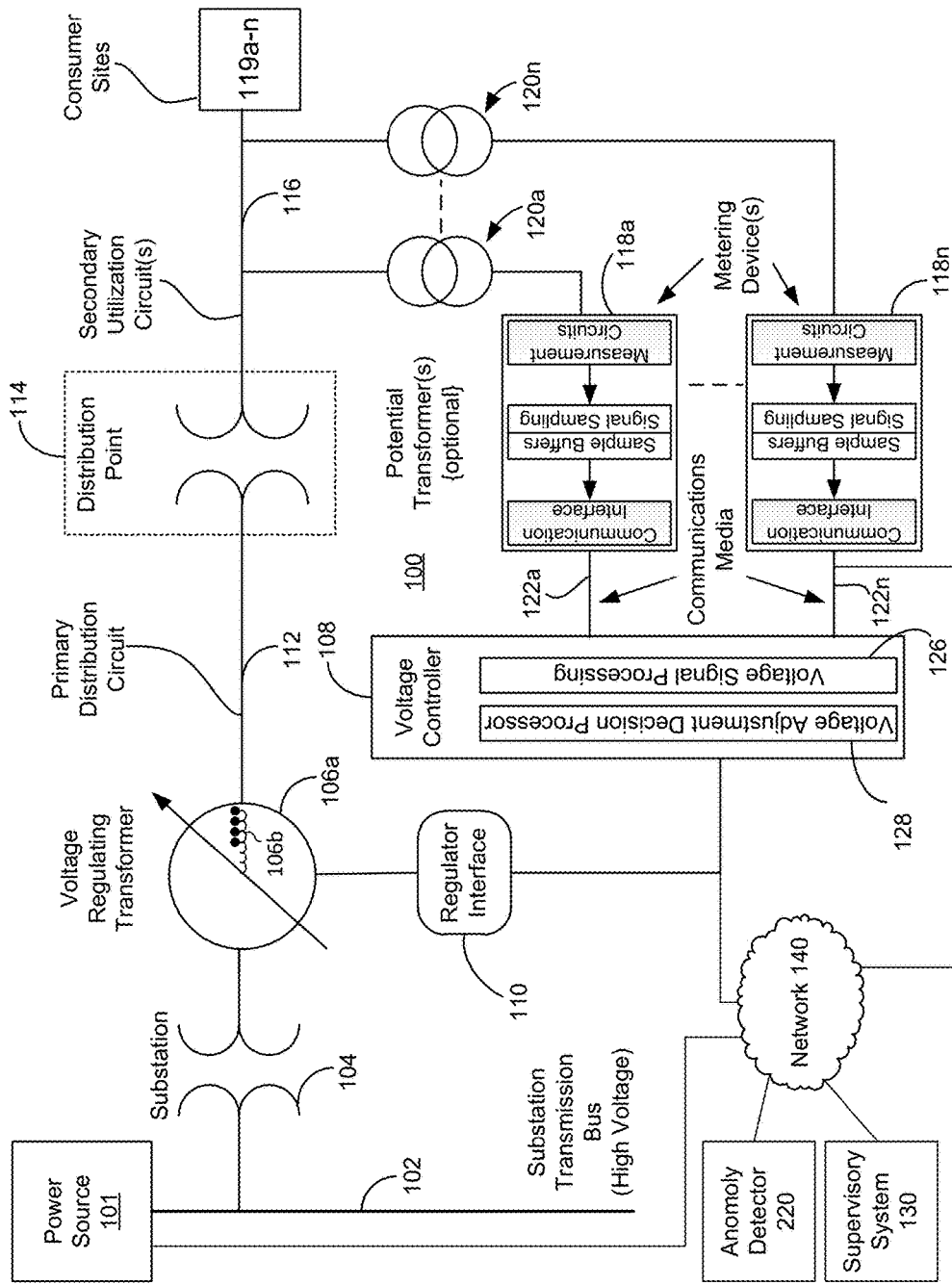
FIG. 1 is a block diagram depicting an illustrative utility grid in accordance with an embodiment.

Systems and methods of the present disclosure are directed to emulating a regulating device (e.g., a voltage regulator or controller) to detect utility grid intrusions. Utility grids use digital computation devices and systems to measure, monitor, and control aspects of the utility grid and protect assets of the utility grid. Digital computing devices can include, e.g., grid digital instrumentation such as voltage controllers, regulators, or metering devices. When these digital computation devices are connected to communication networks (e.g., the Internet for the purpose of remote supervision, remote measurement, or remote status reporting), they may be vulnerable to attacks such as cyber-attacks or electronic attacks. An attack can include an intrusion by malicious software code such as viruses or other malware. Even if the system includes digital network protection devices or systems (e.g., firewalls, virus scanning applications, etc.), the system may not detect the presence of the malicious code at all, or for a duration of time. Therefore, the malicious code may execute on the system and cause anomalies such as abnormal asset operations, disturbances to energy delivery conditions in the utility grid, and may even cause service interruptions and asset damage. However, since the system may not identify the anomaly or detect the malicious code, the anomaly or the cause of such anomaly or abnormality may be unknown. Further, since a supervisory system remote from an infected device may not receive the same samples or observations the device receives and acts upon, it may be challenging for such a supervisory system to detect the anomaly in the infected device.

Systems and methods of the present disclosure can detect an attack in a utility grid. For example, the systems and methods can include a supervisory system having an anomaly detector that is remote from a device or digital asset on the utility grid, such as a regulator, regulating device or controller. The anomaly detector can emulate the regulator. For example, the anomaly detector can identify a procedure for formulating a REM of a process and estimating parameters associated with that REM using observations of the process behavior (e.g., signals). The anomaly detector can use the REM to emulate the voltage response behavior of the regulator to determine when a behavior of the regulator deviates from the modelled behavior. Responsive to detecting that a behavior of the regulator deviates from the REM, the anomaly detector can detect an anomaly, specifically the actions of some intrusive software component in the utility network, that is either malware operating in one or more of the digital devices in the utility network or an intruder or malicious agent operating on the digital device in the utility network from outside such network. The digital devices can include components of a supervisory control and data acquisition system ("SCADA"). Thus, by detecting the anomaly, the anomaly detector can provide a notification of the anomaly or take an action to mitigate or remedy the anomalous behavior.

To detect anomalies in the utility grid, the anomaly detector can employ or utilize behavior detection metrics obtained from properties of estimators derived from signals. The signals can correspond to signals used by the digital device of the utility grid, such as a voltage regulator. A voltage regulator can be an instrument or digital device that can wind tap positions of a voltage-regulating transformer in response to voltages measured at the load terminals of such a transformer and in accordance with its programming.

A voltage-regulating transformer may be either a tapped autotransformer (VR) or an on-load tap changing transformer (LTC). The programming of the control device comprises one or more alternative algorithms for the purpose of voltage regulation, along with the facility to specify which algorithm shall be operational and the facility to set any parameters required by the algorithm. The voltage regulator control may operate autonomously, consistent with such settings, or may operate, if equipped with suitable means for communication with external systems, under the supervision of a remote system, the latter comprising either an automated or human-operated system.

If the behavior of the voltage regulator control is automated, such behavior can be consistent with the interaction between a specified algorithm and the voltage signals to which the voltage regulator control is exposed. When external communication facility is present, the signals that reveal both the excitation (controlled voltage) and the response (controller actions) may be provided to an external supervisory system acting as an observer.

The external supervisory system can include an anomaly detector configured to identify a REM to emulate the algorithm operating in the voltage regulator control such that the settings, parameters, and configuration of the voltage regulator control's algorithm may be identified by analysis of the behavior of the observed signals, as such settings may not be known or knowable (since these are subject to modification without notifying the supervisory system). Further, the anomaly detector, having identified the REM, can then recognize control behavior that is inconsistent with or deviates from the behavior predicted by the REM.

However, due to limitations in the telemetry systems that can be deployed in SCADA communication infrastructure, and due to differences in the mechanism by which the voltage regulator control and the anomaly detector of the supervisory system acquire the signals, it can be challenging for the anomaly detector to identify a REM that accurately and reliably emulates the behavior of the voltage regulator control. For example, the voltage signals measured by the voltage regulator control may be sampled and acquired at a rate faster than that achievable by the anomaly detector of the remote supervisory system, such that the sampled signal available to the anomaly detector may include fewer samples and, therefore, reduced information content. Further, electricity distribution circuits of the utility grid can connect many devices for the purpose of control and operational management, and share connections with other such circuits manifested in several ways, including, for example: common source connectivity, circuits originating from a single distribution transformer; common source connectivity, circuits originating from the same substation; and common secondary connectivity, circuits interconnected at or near delivery points, where the connection voltage can be a consumer service voltage. Thus control activity by devices on a circuit may influence conditions on other circuits and make it challenging to accurately or reliably emulate behavior of components.

To solve the technical problem arising from the anomaly detector of the supervisory system having reduced information content while accounting for influences due to various devices on the utility grid, the anomaly detector can be configured with procedures to identify or learn the voltage regulator control's behavior with sufficient precision to discriminate between nominal and anomalous behavior. For example, the anomaly detector can identify or learn parameters or settings of the voltage regulator controller's internal algorithm based on observed behavior; the anomaly detector can discriminate between nominal and abnormal tap setting behavior of the voltage regulator controller after the initial "learning" process has concluded; and the anomaly detector can continuously improve upon learned parameter estimates using features of observed tap setting actions and the associated relevant voltages.

To do so, the anomaly detector can detect tap setting changes using position information reported by the voltage regulator controller. In some cases, the anomaly detector can detect tap setting changes using reported controlled voltage and a statistical technique for step location in time series. The anomaly detector can use a two-stage estimate of regulator tap setting assertion delay which can include: 1) a coarse estimate by counting observed voltage samples meeting an estimated criterion in time reverse followed by 2) a fine estimate using a statistical method for step location. The anomaly detector can improve precision of "learned" parameter estimates on the basis of comparative variances of extant estimate and most recent example estimate.

The anomaly detector can perform high resolution estimation of edge properties in spatial series or time series signal by modeling a possible manifest edge in such a series as a cumulative distribution function, then estimating the sample location of the manifest edge, and the magnitude levels of the signal leading and following the edge by equating the first three moments of the ideal step-edge cumulative distribution function to the moments computed from the signal under consideration. For example, the anomaly detector can utilize a technique suited for this purpose based on the following reference: Tabatabai, A. J., Mitchell, O. R., "Edge Location to Subpixel Values in Digital Imagery", IEEE Transactions on Pattern Analysis and Machine Intelligence, Vol. PAMI-6, No. 2, March 1984, pp 188-201, which is hereby incorporated by reference in its entirety. The calculation and assignment of statistical moments as recited in this reference can be adapted to time series signals, for example, of distribution circuit voltages or other electrical measurements in such circuits.

The anomaly detector can identify a REM and emulate the voltage regulator control to identify nominal and anomalous tap setting change events of the voltage regulator control. The anomaly detector can operate in multiple states, each having one or more steps of analysis, estimation, and classification. The anomaly detector can be triggered to perform these processes or techniques responsive to various events. For example, the anomaly detector can be triggered responsive to the identification of a discrete change in a relevant voltage signal of a magnitude sufficient to indicate a possible tap setting change at the voltage regulator controller. In another example, the voltage regulator control can be triggered responsive to detecting a tap setting change by a change in the tap setting position as reported by the voltage regulator control. If the voltage regulator control and its associated voltage-regulating transformer are functioning nominally, these two triggers can both occur, although they may be separated by a sample instance as recorded by the anomaly detector due to the difference in sampling rates and the lack of consistent synchronism in the local and remote sampling processes.

The voltage control algorithms in commercially available regulator controllers can assert tap setting changes if the relevant observed voltage crosses threshold values for time intervals (e.g., is greater than a first threshold for a duration of time). The anomaly detector can be configured to detect and model both high and low voltage threshold crossings.

Based on the two types of triggers (T1—the regulator control reports a change in the position of the tap setting mechanism; and T2—the regulator control reports no tap setting activity, instead, reporting of a possible tap setting change is determined by the presence of magnitude change in a series of samples of the relevant voltage time series), the anomaly detector can apply a statistical edge estimation technique to the recorded voltage time series to estimate the position, magnitude, and variances of a step change in the voltage time series, and determine the sense or direction of the change (e.g., increase or decrease). The statistical edge estimation technique can be configured to operate on a voltage time series that can include a random signal component.

The anomaly detector can prepare or pre-process the signals prior to identifying the REM to emulate the behavior of the voltage regulator. For example, since the anomaly detector is configured to emulate singular tap setting changes, the anomaly detector can pre-qualify buffered signals to facilitate correct operation. Pre-processing or pre-qualifying the signals can include the anomaly detector verifying that the buffered time series of the tap setting (e.g., position), as recorded by sampling this signal at the voltage regulator control, includes only one tap setting change event. In some cases, the anomaly detector can separately utilize voltage time series information that include no tap setting change events or more than one tap setting change events to provide classifiable information outside the emulation process.

In the pre-processing or pre-qualification step, the anomaly detector can estimate the parameters of the tap change event model that characterize a single tap change event. These models emulate the tap change assertion behavior of the voltage regulator controls, which may be characterized as delayed threshold response control. Since the tap setting changes in voltage regulators affect the voltage observed at the device load terminals, the anomaly detector can emulate the regulator control's tap setting decision process that uses the load terminal voltage as the selected relevant voltage, and proceeds as follows:

the magnitude of a selected voltage signal crossing a prescribed threshold starts a countdown timer, the latter having a prescribed time delay previously set;
  the timer continues its countdown as long as the selected voltage remains beyond the prescribed threshold;

if the timer counts to zero, a tap change opposing the direction of the voltage threshold crossing is asserted by the control;

if the selected voltage retreats such that the prescribed threshold is not encroached, then the voltage regulator control can take one of two possible actions:

the countdown is terminated and the timer is reset, or the countdown is reversed, and the timer counts 'up' until either the prescribed time setting is reached, stopping the count 'up', or the selected voltage once again raises the threshold and begins the countdown from the current status of the timer, which may be less than the prescribed time setting.

The analysis of externally observed examples of this process can include the following three operations, leveraging both prior knowledge of the algorithmic behavior of the subject voltage regulator control and by the realization that external observation and sampling of the relevant signals is both temporally coarser than and asynchronous to these signals as observed by the subject control.

a coarse estimate of the time delay setting obtained by emulation of the timing process in reverse, starting with the observed tap setting change and counting samples of the relevant voltage signal backward in time from this change, while accounting for the threshold behavior of the timer in the subject control;

a fine estimate, resolved to less than an external sampling interval, carried out using an adaptation of the statistical edge estimator procedure, improving the accuracy of the time delay estimate; and estimating the magnitude of the relevant voltage prior to the tap setting action by the voltage regulator control, and the magnitude of the change in the relevant voltage resulting from the tap setting action.

The anomaly detector can also apply these techniques to analysis of the voltage regulator source voltage, as this voltage may be subject to variation caused by influences exogenous to the subject voltage regulator, and such variations may in turn be influential in tap setting decisions by the subject regulator. The anomaly detector can propagate the decision influence in this manner to facilitate detecting whether tap changes and voltage changes are expected or anomalous for all T2 tap event triggers (e.g., regulator control reports no tap setting activity, instead, reporting of a possible tap setting change is determined by the presence of magnitude change in a series of samples of the relevant voltage time series).

The anomaly detector can operate in one or more states to emulate the behavior of the voltage regulator control based on the identified REM. In a first operating state, the anomaly detector can learn the behavior of the voltage regulator control to identify the REM. In a second operating state, the anomaly detector can critique the REM. In a third operating state, the anomaly detector can snoop or monitor the voltage regulator control to detect anomalous behavior.

For example, in the first operating state (or "learn state" or "learning phase"), the anomaly detector may not yet have identified a REM that can satisfactorily emulate the behavior of the voltage regulator control. The convergence criteria for acceptable estimates of the subject voltage regulator control's hidden parameters may not yet be met. Therefore, the anomaly detector may obtain more instances of tap setting changes to learn the behavior. In this learning phase, the anomaly detector can use T1 type tap event triggers to identify the REM. For example, the occurrence of T1 type tap event trigger can initiate the following processes:

an analysis of the tap event;

an update to the estimates of the hidden parameters; and determination of the satisfactory convergence of these estimates.

The anomaly detector can enter the second operating state (or 'critic state' or 'critic phase'), or upon determining that the convergence criteria for acceptable estimates of the voltage regulator control's hidden parameters have been met, such that the identified REM can be used to examine tap event occurrences to determine the level of conformance with the learned, modelled behavior. For example, the occurrence of T1 type tap event trigger can initiate the following processes:

(i) an analysis of the tap event;

(ii) determination of the degree of conformance to the 'learned' expected behavior;

(iii) if (ii) is satisfactory, update of the learned parameters using the behavior of only those events determined to be in conformance, and report the occurrence of a 'nominal' event;

(iv) if (ii) is unsatisfactory, report the occurrence of an 'anomalous' event, and submit the analysis performed in (ii) to a classification process.

The anomaly detector can enter the third operating state (or 'snoop state' or 'snoop phase') upon the convergence criteria for acceptable estimates of the subject voltage regulator's hidden parameters having been met, such that the REM can be used to determine a level of conformance between observed tap event occurrences and the modelled behavior as learned by the anomaly detector in the first state. Since it is possible that a tap event could occur in the absence of an event trigger T1, the anomaly detector can identify a type T2 trigger. The anomaly detector can identify the type T2 trigger as a tap change event based on an approximate step change in the magnitude of a relevant voltage. Thus, the third operating state or 'snooping' can include:

(i) identification of a tap event trigger (T2) as previously described;

(ii) application of the Statistical Edge Estimator edge identification process to the source voltage of the subject regulator;

(iii) determination of the degree of conformance to the 'learned' expected behavior;

(iv) if (iii) indicates that a voltage change event has occurred, proceed to (v);

(v) if (iv) is satisfactory, report an event in the absence of tap event trigger (1), and submit the analysis performed in (iii) to a classification process;

(vi) if (iv) is not satisfactory, report a voltage disturbance due to other causes, and submit the analyses performed in (ii) and (iii) to a classification process.

The anomaly detector can detect anomalous voltage regulation events that can be categorized as (1) device defects—anomalies traceable to failures in the tap changing mechanism or to the tap setting feedback device(s); or (2) process defects—anomalies traceable to inconsistency between the relevant voltage signal and the tap setting response of the voltage regulator and its control. The anomaly detector can classify the detected anomalies into these categories. Using the REM to estimate the behavior and detect the anomaly, the anomaly detector can classify regulation control events as nominal (expected) or anomalous (unexpected or otherwise irregular), and further determine possible causes and actionable remedies. The anomaly detector can classify the regulation control events using the analyzed attributes of individual tap setting events and voltage change events, as well as sequential occurrences of two or more tap setting events and voltage change events.

Thus, the anomaly detector can determine information about voltage regulation processors that allow regulation control events to be classified as nominal or anomalous, and further identify causes and remedies. For example, the determined information about the voltage regulation processes can include:

Pre-qualification of buffered signals
        number of tap setting changes as observed in tap position signal
        setting displacement for each tap setting change, observed on adjacent sample
        sample displacement (analogous to time difference) between tap setting changes
    Critic emulation state
        full attributes for tap setting change
            prior load voltage magnitude, actual dwell delay, and load voltage change
            determination of tap setting event as nominal or anomalous
            variances of load voltage attributes
        measures of source voltage attributes
            source voltage change magnitude
            variance of source voltage prior/post
    Snoop emulation state when (T2) trigger is observed
        complete 'Critic' analysis results
        sample displacement between source and load voltage changes where applicable The anomaly detector can classify the anomaly using the above attributes based on a classification table. For example, the attributes can map to a classification such as "nominal", which can refer to an expected operation where no action required. A classification "Device defect" can indicate to take action that includes device inspection or maintenance action. A classification "anomaly" can indicate an unexpected or unsupported operation, and indicate to take an action that includes performing an investigation. A classification "critical anomaly" can indicate to take an action that includes performing an immediate mitigation because the device may be at risk.

FIG. 1 illustrates a utility grid 100 including an electricity distribution grid with several devices, assets, or digital computational devices and systems, such as computing device 200. In brief overview, the utility grid 100 includes a power source 101 that can be connected via a subsystem transmission bus 102 and/or via substation transformer 104 to a voltage-regulating transformer 106a. The voltage-regulating transformer 106a can be controlled by voltage controller 108 with regulator interface 110 (e.g., can also be referred to as a voltage regulator control, voltage regulator, regulator, or controller). Voltage-regulating transformer 106a may be optionally coupled on primary distribution circuit 112 via optional distribution transformer 114 to secondary utilization circuits 116 and to one or more electrical or electronic devices 119. Voltage-regulating transformer 106a can include multiple tap outputs 106b with each tap output 106b supplying electricity with a different voltage level. The utility grid 100 can include monitoring devices 118a-118n that may be coupled through optional potential transformers 120a-120n to secondary utilization circuits 116. The monitoring or metering devices 118a-118n may detect (e.g., continuously, periodically, based on a time interval, or responsive to an event or trigger) measurements and continuous voltage signals of electricity supplied to one or more electrical devices 119 connected to circuit 112 or 116 from a power source 101 coupled to bus 102. A voltage controller 108 can receive, via a communication media 122, measurements obtained by the metering devices 118a-118n, and use the measurements to make a determination regarding a voltage tap settings, and provide an indication to regulator interface 110. The regulator interface can communicate with voltage-regulating transformer 106a to adjust an output tap level 106b.

Still referring to FIG. 1, and in further detail, the utility grid 100 includes a power source 101. The power source 101 may include a generating station such as an installation configured to generate electrical power for distribution. The power source 101 may include an engine, a turbine or other apparatus that generates electrical power. The power source 101 may create electrical power by converting power or energy from one state to another state. In some embodiments, the power source 101 may be referred to or include a power plant, power station, generating station, powerhouse, or generating plant. In some embodiments, the power source 101 may include a generator, such as a rotating machine that converts mechanical power into electrical power by creating relative motion between a magnetic field and a conductor. The power source 101 can use one or more energy sources to turn the generator including, e.g., fossil fuels such as coal, oil, and natural gas, nuclear power, or cleaner renewable sources such as solar, wind, wave, and hydroelectric.

In some embodiments, the utility grid 100 includes one or more substation transmission busses 102. The substation transmission bus 102 can include or refer to transmission tower, such as a structure (e.g., a steel lattice tower, concrete, wood, etc.), that supports an overhead power line used to distribute electricity from a power source 101 to a substation 104 or distribution point 114. Transmission towers 102 can be used in high-voltage AC and DC systems, and come in a wide variety of shapes and sizes. In an illustrative example, a transmission tower can range in height from 15 to 55 meters or up to several hundred meters. Transmission towers 102 can be of various types including, e.g., suspension, terminal, tension, and transposition. In some embodiments, the utility grid 100 may include underground power lines in addition to or instead of transmission towers 102.

In some embodiments, the utility grid 100 includes a substation 104 or electrical substation 104 or substation transformer 104. A substation may be part of an electrical generation, transmission, and distribution system. In some embodiments, the substation 104 transforms voltage from high to low, from low to high, or performs any of several other functions to facilitate the distribution of electricity. In some embodiments, the utility grid 100 may include several substations 104 between the power plant 101 and the consumer electoral devices 119 with electric power flowing through them at different voltage levels.

In some embodiments, the substations 104 may be remotely operated, supervised and controlled (e.g., via a supervisory system 130 or supervisory control and data acquisition system 130). A substation may include one or more transformers to change voltage levels between high transmission voltages and lower distribution voltages, or at the interconnection of two different transmission voltages.

The supervisory system 130 can communicate, interact, or interface with substations 104 via network 140. In some cases, the supervisory system 130 can be located at or near a substation 104. In some cases, the substation 104 includes the supervisory system 130. The supervisory system 130 can be setup at the substation and connect with one or more components of the substation 104 via a private connection or a direct connection. The supervisory system 130 can be configured to automatically control the substation or one or more component of the utility grid 100.

The supervisory system 130 can be configured to perform data acquisition, supervision, or control. The supervisory system 130 can perform data acquisition by acquiring, or collecting, data such as measured analog current, voltage values, or the open or closed status of contact points. Acquired data can be used locally within the device collecting it, sent to another device in a substation, or sent from the substation to one or several databases for use by operators, engineers, planners, and administration.

The supervisory system 130 can facilitate supervising the utility grid or the substation via computer processes and providing personnel access to information. The supervisory system 130 can supervise, or monitor, the conditions and status of the utility grid 100 using this acquired data. The supervisory system 130 can display reports or alerts to operators or engineers of the utility grid 100. For example, operators and engineers can monitor the information remotely on computer displays and graphical wall displays or locally, at the device or substation, on front-panel displays and laptop computers.

The supervisory system 130 can control the substation or one or more digital computation device of the utility grid 100 by sending command messages to the digital computation device to operate. In some cases, an operator supervising the system can initiate commands from an operator console. Field personnel can also control digital computation devices using front-panel push buttons or a laptop computer. In some embodiments, the supervisory system 130 can automatically send a command, instruction, or message to a digital computation device responsive to an alert or instruction received from the anomaly detector 220. The supervisory system 130 can, responsive to the alert, adjust an operation parameter of the digital computation device. For example, the supervisory system 130 can, responsive to the alert indicating that a digital computation device has been affected by an attack that causes an anomaly, disable the digital computation device, reset the digital computation device, restart the digital computation device, reset the digital computation device to factory settings, or apply a software patch or update to the digital computation device. In some cases, an operator, engineer, or other personnel can adjust the operational parameter responsive to the report or alert. The operator, engineer, or other personnel can adjust the operation parameter via the supervisory system 130, or may directly adjust the digital computation device via an input/output interface of the digital computation device.

The supervisory system 130 can perform power-system integration by communicating data to, from, or among metering devices, control devices, digital grid instrumentation, or remote users. Substation integration can refer to combining data from metering device local to a substation so that there is a single point of contact in the substation for instrumentation and control.

In some embodiments, the voltage-regulating transformer 106a is can include: (1) a multi-tap autotransformer (single or three phase), which are used for distribution; or (2) on-load tap changer (three phase transformer), which can be integrated into a substation transformer 104 and used for both transmission and distribution. The illustrated system described herein may be implemented as either a single-phase or three-phase distribution system. The utility grid 100 may include an alternating current (AC) power distribution system and the term voltage may refer to an "RMS Voltage", in some embodiments.

In some embodiments, the utility grid 100 includes a distribution point 114 or distribution transformer 114, which may refer to an electric power distribution system. In some embodiments, the distribution point 114 may be a final or near final stage in the delivery of electric power. For example, the distribution point 114 can carry electricity from the transmission system (which may include one or more transmission towers 102) to individual consumers 119. In some embodiments, the distribution system may include the substations 104 and connect to the transmission system to lower the transmission voltage to medium voltage ranging between 2 kV and 69 kV with the use of transformers, for example. Primary distribution lines or circuit 112 carry this medium voltage power to distribution transformers located near the customer's premises 119. Distribution transformers may further lower the voltage to the utilization voltage of appliances and may feed several customers 119 through secondary distribution lines or circuits 116 at this voltage. Commercial and residential customers 119 may be connected to the secondary distribution lines through service drops. In some embodiments, customers demanding high load may be connected directly at the primary distribution level or the sub-transmission level.

In some embodiments, the utility grid 100 includes or couples to one or more consumer sites 119. Consumer sites 119 may include, for example, a building, house, shopping mall, factory, office building, residential building, commercial building, stadium, movie theater, etc. The consumer sites 119 may be configured to receive electricity from the distribution point 114 via a power line (above ground or underground). In some embodiments, a consumer site 119 may be coupled to the distribution point 114 via a power line. In some embodiments, the consumer site 119 may be further coupled to a site meter 118a-118n or advanced metering infrastructure ("AMI").

In some embodiments, the utility grid 100 includes site meters 118a-118n or AMI. Site meters 118a-118n can measure, collect, and analyze energy usage, and communicate with metering devices such as electricity meters, gas meters, heat meters, and water meters, either on request or on a schedule. Site meters 118a-118n can include hardware, software, communications, consumer energy displays and controllers, customer associated systems, Meter Data Management (MDM) software, or supplier business systems. In some embodiments, the site meters 118a-118n can obtain samples of electricity usage in real time or based on a time interval, and convey, transmit or otherwise provide the information. In some embodiments, the information collected by the site meter may be referred to as meter observations or metering observations and may include the samples of electricity usage. In some embodiments, the site meter 118a-118n can convey the metering observations along with additional information such as a unique identifier of the site meter 118a-118n, unique identifier of the consumer, a time stamp, date stamp, temperature reading, humidity reading, ambient temperature reading, etc. In some embodiments, each consumer site 119 (or electronic device) may include or be coupled to a corresponding site meter or monitoring device 118a-118n.

Monitoring devices 118a-118n may be coupled through communications media 122a-122n to voltage controller 108. Voltage controller 108 can compute (e.g., continuously or based on a time interval or responsive to a condition/event) values for electricity that facilitates regulating or controlling electricity supplied or provided via the utility grid. For example, the voltage controller 108 may compute estimated deviant voltage levels that the supplied electricity (e.g., supplied from power source 101) will not drop below or exceed as a result of varying electrical consumption by the one or more electrical devices 119. The deviant voltage levels may be computed based on a predetermined confidence level and the detected measurements. Voltage controller 108 can include a voltage signal processing circuit 126 that receives sampled signals from metering devices 118a-118n. Metering devices 118a-118n may process and sample the voltage signals such that the sampled voltage signals are sampled as a time series (e.g., uniform time series free of spectral aliases or non-uniform time series).

Voltage signal processing circuit 126 may receive signals via communications media 122a-122n from metering devices 118a-118n, process the signals, and feed them to voltage adjustment decision processor circuit 128. Although the term "circuit" is used in this description, the term is not meant to limit this disclosure to a particular type of hardware or design, and other terms generally known such as the term "element", "hardware", "device", or "apparatus" could be used synonymously with or in place of the term "circuit" and may perform the same function. For example, in some embodiments, the functionality may be carried out using one or more digital processors, e.g., implementing one or more digital signal processing algorithms. Adjustment decision processor circuit 128 may determine a voltage location with respect to a defined decision boundary and set the tap position and settings in response to the determined location. For example, the adjustment decision processing circuit 128 in voltage controller 108 can compute a deviant voltage level that is used to adjust the voltage level output of electricity supplied to the electrical device. Thus, one of the multiple tap settings of voltage-regulating transformer 106a can be continuously selected by voltage controller 108 via regulator interface 110 to supply electricity to the one or more electrical devices based on the computed deviant voltage level. The voltage controller 108 may also receive information about voltage-regulating transformer 106a or output tap settings 106b via the regulator interface 110. Regulator interface 110 may include a processor controlled circuit for selecting one of the multiple tap settings in voltage-regulating transformer 106a in response to an indication signal from voltage controller 108. As the computed deviant voltage level changes, other tap settings 106b (or settings) of voltage-regulating transformer 106a are selected by voltage controller 108 to change the voltage level of the electricity supplied to the one or more electrical devices 119.

The network 140 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel, or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA. In some embodiments, different types of data may be transmitted via different links and standards. In other embodiments, the same types of data may be transmitted via different links and standards.

The network 140 may be any type and/or form of network. The geographical scope of the network 140 may vary widely and the network 140 can be a body area network (BAN), a personal area network (PAN), a local-area network (LAN), e.g., Intranet, a metropolitan area network (MAN), a wide area network (WAN), or the Internet. The topology of the network 140 may be of any form and may include, e.g., any of the following: point-to-point, bus, star, ring, mesh, or tree. The network 140 may be an overlay network which is virtual and sits on top of one or more layers of other networks 104'. The network 140 may be of any such network topology as known to those ordinarily skilled in the art capable of supporting the operations described herein. The network 140 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 140 may be a type of a broadcast network, a telecommunications network, a data communication network, or a computer network.

One or more components, assets, or devices of utility grid 100 may communicate via network 140. The utility grid 100 can one or more networks, such as public or private networks. The utility grid 100 can include an anomaly detector 200 designed and constructed to communicate or interface with utility grid 100 via network 140. Each asset, device, or component of utility grid 100 can include one or more computing devices 200 or a portion of computing 200 or some or all functionality of computing device 200.

Figure 2A:
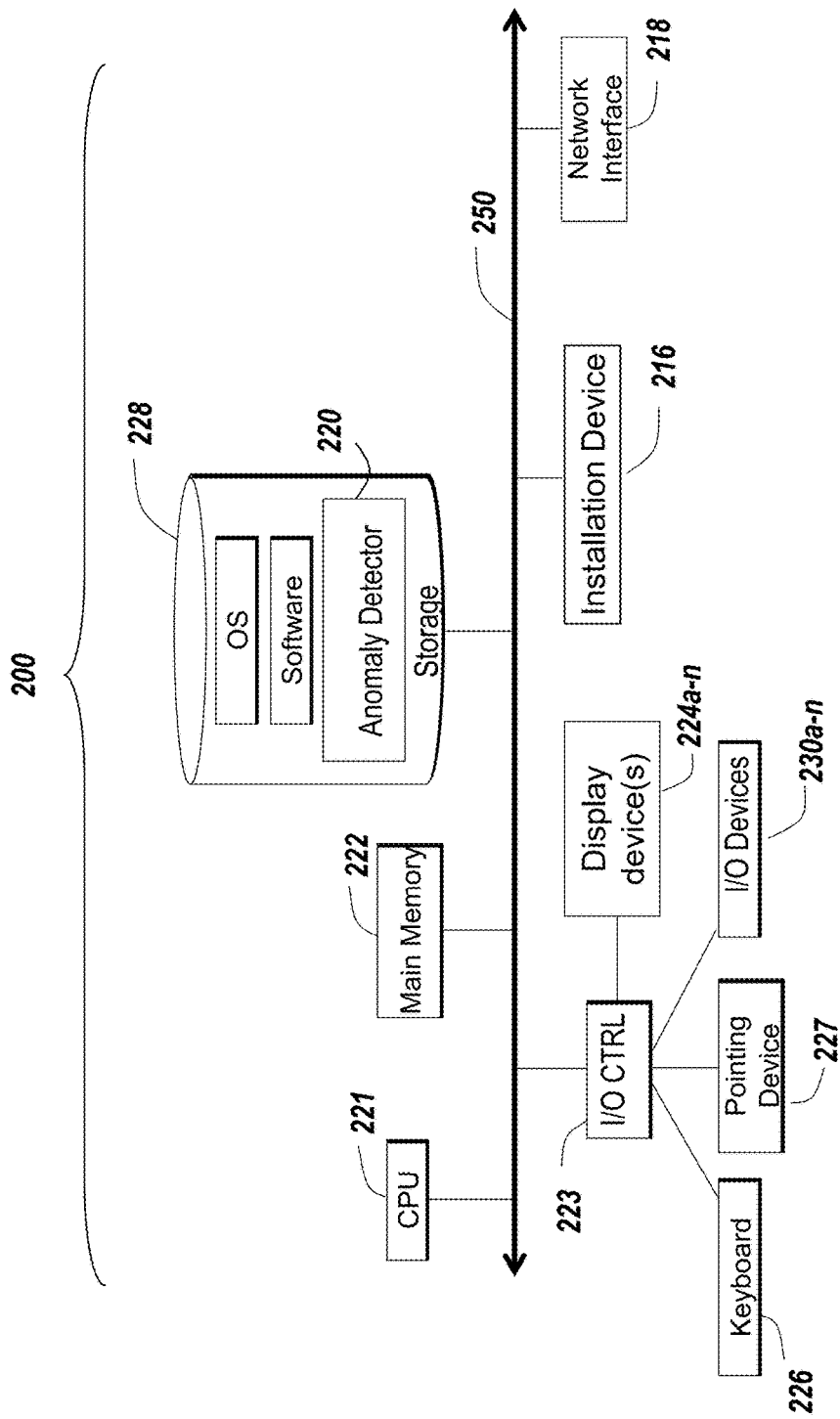
FIGS. 2A and 2B are block diagrams depicting embodiments of computing devices useful in connection with the systems and methods described herein.
Figure 2B:
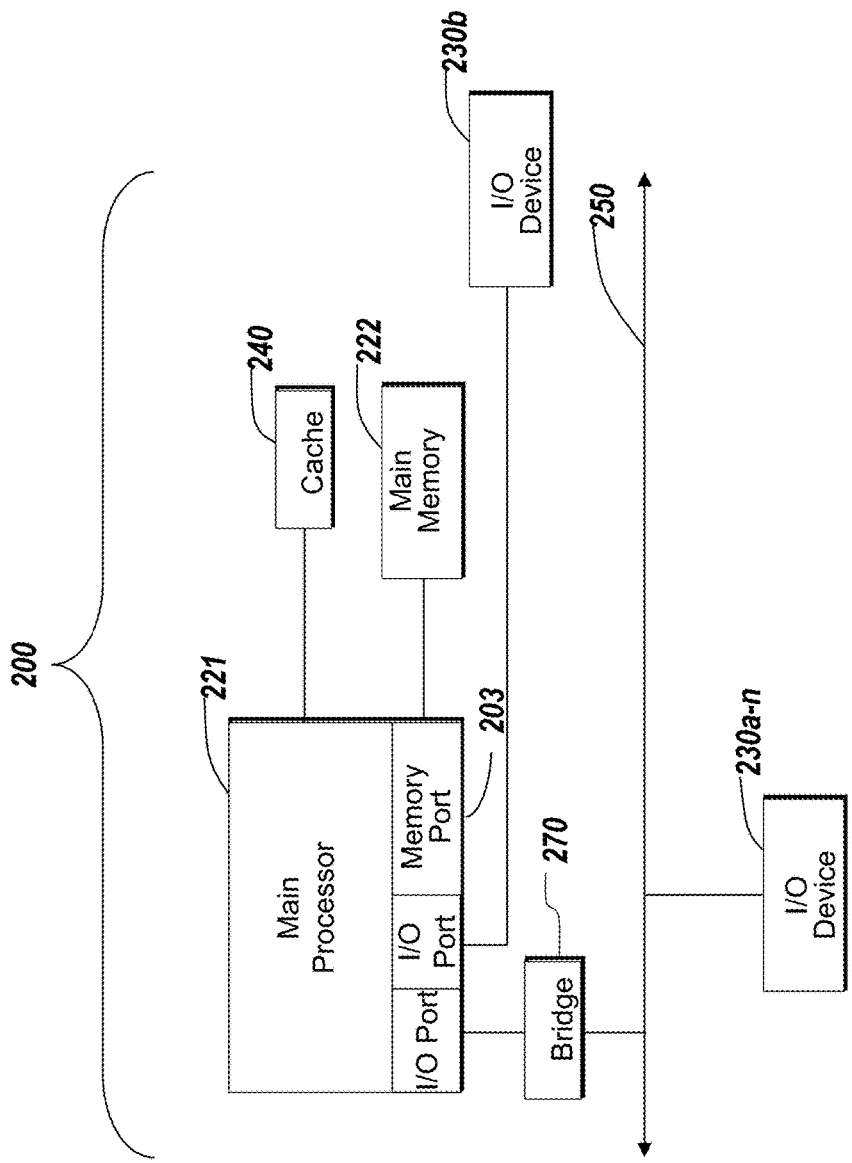

FIGS. 2A and 2B depict block diagrams of a computing device 200. As shown in FIGS. 2A and 2B, each computing device 200 includes a central processing unit ("CPU") 221, and a main memory unit 222. As shown in FIG. 2A, a computing device 200 may include a storage device 228, an installation device 216, a network interface 218, an I/O controller 223, display devices 224a-224n, a keyboard 226, and a pointing device 227, e.g. a mouse. The storage device 228 may include, without limitation, an operating system, software, and a software of a geographical ticker system (GTS) 220. As shown in FIG. 2B, each computing device 200 may also include additional optional elements, e.g. a memory port 203, a bridge 270, one or more input/output devices 230a-230n (generally referred to using reference numeral 230), and a cache memory 240 in communication with the central processing unit 221.

The central processing unit 221 is any logic circuitry that responds to and processes instructions fetched from the main memory unit 222. In many embodiments, the central processing unit 221 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 200 may be based on any of these processors, or any other processor capable of operating as described herein. The central processing unit 221 may utilize instruction level parallelism, thread level parallelism, different levels of cache, and multi-core processors. A multi-core processor may include two or more processing units on a single computing component. Examples of multi-core processors include the AMID PHENOM IIX2, INTEL CORE i5 and INTEL CORE i7.

Main memory unit 222 may include one or more memory chips capable of storing data and allowing any storage location to be directly accessed by the microprocessor 221. Main memory unit 222 may be volatile and faster than storage 228 memory. Main memory units 222 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 222 or the storage 228 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 222 may be based on any of the above described memory chips, or any other available memory chips capable of operating as described herein. In the embodiment shown in FIG. 2A, the processor 221 communicates with main memory 222 via a system bus 250 (described in more detail below). FIG. 2B depicts an embodiment of a computing device 200 in which the processor communicates directly with main memory 222 via a memory port 203. For example, in FIG. 2B the main memory 222 may be DRDRAM.

FIG. 2B depicts an embodiment in which the main processor 221 communicates directly with cache memory 240 via a secondary bus, sometimes referred to as a backside bus. In other embodiments, the main processor 221 communicates with cache memory 240 using the system bus 250. Cache memory 240 typically has a faster response time than main memory 222 and is typically provided by SRAM, BSRAM, or EDRAM. In the embodiment shown in FIG. 2B, the processor 221 communicates with various I/O devices 230 via a local system bus 250. Various buses may be used to connect the central processing unit 221 to any of the I/O devices 230, including a PCI bus, a PCI-X bus, or a PCI-Express bus, or a NuBus. For embodiments in which the I/O device is a video display 224, the processor 221 may use an Advanced Graphics Port (AGP) to communicate with the display 224 or the I/O controller 221 for the display 224. FIG. 2B depicts an embodiment of a computer 200 in which the main processor 221 communicates directly with I/O device 230b or other processors 221' via HYPERTRANSPORT, RAPIDIO, or INFINIBAND communications technology. FIG. 2B also depicts an embodiment in which local busses and direct communication are mixed: the processor 221 communicates with I/O device 230a using a local interconnect bus while communicating with I/O device 230b directly.

A wide variety of I/O devices 230a-230n may be present in the computing device 200. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 230a-230n may include a combination of multiple input or output devices, including, e.g., Microsoft KINECT, Nintendo Wiimote for the WII, Nintendo WII U GAMEPAD, or Apple IPHONE. Some devices 230a-230n allow gesture recognition inputs through combining some of the inputs and outputs. Some devices 230a-230n provides for facial recognition which may be utilized as an input for different purposes including authentication and other commands. Some devices 230a-230n provides for voice recognition and inputs, including, e.g., Microsoft KINECT, SIRI for IPHONE by Apple, Google Now, or Google Voice Search.

Additional devices 230a-230n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 230a-230n, display devices 224a-224n or group of devices may be augment reality devices. The I/O devices may be controlled by an I/O controller 221 as shown in FIG. 2A. The I/O controller may control one or more I/O devices, such as, e.g., a keyboard 126 and a pointing device 227, e.g., a mouse or optical pen. Furthermore, an I/O device may also provide storage and/or an installation medium 116 for the computing device 200. In still other embodiments, the computing device 200 may provide USB connections (not shown) to receive handheld USB storage devices. In further embodiments, an I/O device 230 may be a bridge between the system bus 250 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 224a-224n may be connected to I/O controller 221. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 224a-224n may also be a head-mounted display (HMD). In some embodiments, display devices 224a-224n or the corresponding I/O controllers 221 may be controlled through or have hardware support for OPENGL or DIRECTX API or other graphics libraries.

In some embodiments, the computing device 200 may include or connect to multiple display devices 224a-224n, which each may be of the same or different type and/or form. As such, any of the I/O devices 230a-230n and/or the I/O controller 221 may include any type and/or form of suitable hardware, software, or combination of hardware and software to support, enable, or provide for the connection and use of multiple display devices 224a-224n by the computing device 200. For example, the computing device 200 may include any type and/or form of video adapter, video card, driver, and/or library to interface, communicate, connect, or otherwise use the display devices 224a-224n. In one embodiment, a video adapter may include multiple connectors to interface to multiple display devices 224a-224n. In other embodiments, the computing device 200 may include multiple video adapters, with each video adapter connected to one or more of the display devices 224a-224n. In some embodiments, any portion of the operating system of the computing device 200 may be configured for using multiple displays 224a-224n. In other embodiments, one or more of the display devices 224a-224n may be provided by one or more other computing devices connected to the computing device 200, via the network 104. In some embodiments, software may be designed and constructed to use another computer's display device as a second display device 224a for the computing device 200. For example, in one embodiment, an Apple iPad may connect to a computing device 200 and use the display of the device 200 as an additional display screen that may be used as an extended desktop. One ordinarily skilled in the art will recognize and appreciate the various ways and embodiments that a computing device 200 may be configured to have multiple display devices 224a-224n.

Referring again to FIG. 2A, the computing device 200 may comprise a storage device 228 (e.g. one or more hard disk drives or redundant arrays of independent disks) for storing an operating system or other related software, and for storing application software programs such as any program related to the software 220 for the geographical ticker system. Examples of storage device 228 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 228 may be non-volatile, mutable, or read-only. Some storage device 228 may be internal and connect to the computing device 200 via a bus 250. Some storage device 228 may be external and connect to the computing device 200 via an I/O device 230 that provides an external bus. Some storage devices 228 may connect to the computing device 200 via the network interface 218 over a network 104, including, e.g., the Remote Disk for MACBOOK AIR by Apple. Some client devices 200 may not require a non-volatile storage device 228 and may be thin clients or zero clients. Some storage devices 228 may also be used as an installation device 216, and may be suitable for installing software and programs. Additionally, the operating system and the software can be run from a bootable medium, for example, a bootable CD, e.g., KNOPPIX, a bootable CD for GNU/Linux that is available as a GNU/Linux distribution from knoppix.net.

Computing device 200 may also install software or applications from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS, and KINDLE FIRE provided by Amazon.com, Inc.

Furthermore, the computing device 200 may include a network interface 218 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, and fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 200 communicates with other computing devices 200' via any type and/or form of gateway or tunneling protocol, e.g., Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 200 to any type of network capable of communication and performing the operations described herein.

A computing device 200 of the sort depicted in FIG. 2A may operate under the control of an operating system, which controls scheduling of tasks and access to system resources. The computing device 200 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 200 can be any workstation, telephone, desktop computer, laptop or notebook computer, netbook, ULTRABOOK, tablet, server, handheld computer, mobile telephone, smartphone, or other portable telecommunications device, media playing device, a gaming system, mobile computing device, or any other type and/or form of computing, telecommunications, or media device that is capable of communication. The computer system 200 has sufficient processor power and memory capacity to perform the operations described herein. In some embodiments, the computing device 200 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 200 is a gaming system. For example, the computer system 200 may comprise a PLAYSTATION 3, PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 200 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 200 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 200 is a tablet e.g., the IPAD line of devices by Apple; GALAXY TAB family of devices by Samsung; or KINDLE FIRE, by Amazon.com, Inc. of Seattle, Wash. In other embodiments, the computing device 200 is an eBook reader, e.g. the KINDLE family of devices by Amazon.com; or NOOK family of devices by Barnes & Noble, Inc. of New York City, N.Y.

In some embodiments, the communications device 200 includes a combination of devices, e.g., a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 200 is a laptop or desktop computer equipped with a web browser and a microphone and speaker system, e.g. a telephony headset. In these embodiments, the communications devices 200 are web-enabled and can receive and initiate phone calls. In some embodiments, a laptop or desktop computer is also equipped with a webcam or other video capture device that enables video chat and video call.

In some embodiments, the status of one or more machines 200 in the network 104 are monitored, generally as part of network management. In one of these embodiments, the status of a machine may include an identification of load information (e.g., the number of processes on the machine, CPU, and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

Figure 3:
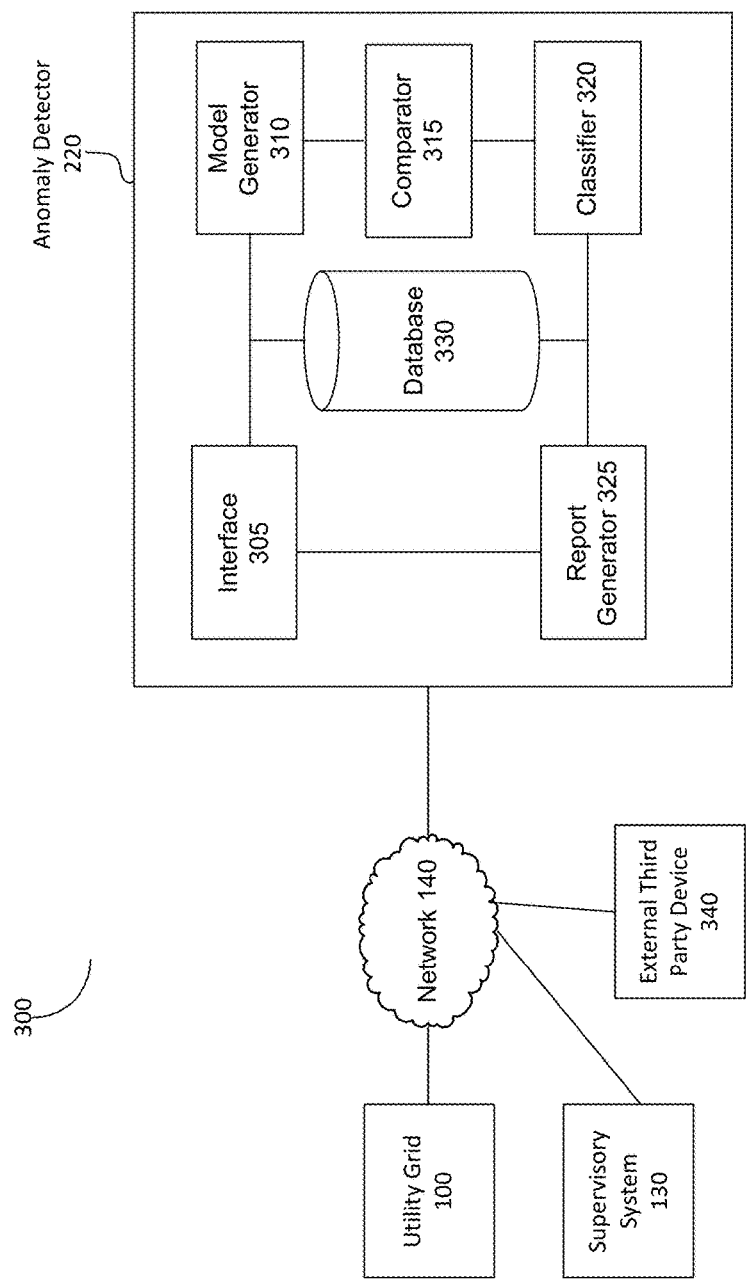
FIG. 3 is a block diagram depicting a system for detecting anomalies in a utility grid in accordance with an embodiment.

Referring now to FIG. 3, a system 300 for detecting anomalies in a utility grid 100 in accordance with an embodiment is shown. In brief overview, the system 300 includes an anomaly detector 220 designed and constructed to detect anomalies in a utility grid 100. The anomaly detector 220 can detect intrusions in a utility network based on identifying a deviation between a voltage change event performed by the voltage controller 108 and a modelled voltage.

The anomaly detector 220 can be part of the supervisory system 130 or otherwise access or communicate with the supervisory system 130. The anomaly detector 220 can include an interface 305 designed and constructed to interface with utility grid 100 via network 140 or other components or systems. The anomaly detector 220 can include a REM generator 310 designed and constructed to receives measurements from utility grid 100 (e.g., via metering devices 118a-118n or supervisory system 130) and identifies a REM configured to estimate a behavior of the voltage regulating controller 108. The anomaly detector 220 can include a comparator 315 designed and constructed to detect a level of conformance with the REM to identify an anomaly. The anomaly detector 220 can include a classifier 320 to classify the identified anomaly. The anomaly detector 220 can include a report generator 325 or a report/alert generator 325 (referred to as a report generator 325) designed and constructed to generate a report based on an anomaly identified via the anomaly detector 220 or transmit an instruction to remedy the anomaly. The report generator 325 can provide the report or instruction to the utility grid 100, or to another system or device via interface 305, such as a supervisory system or operator of the utility grid 100. The anomaly detector 220 can include a database 330 that stores data structures in memory. The data structures can include measurements, metrics, signal samples, parameters, attributes, a classification table, executable code, processes, reports, historical data, etc. The system 300 can include one or more components or functionalities depicted in FIGS. 1, 2A, and 2B. For example, the anomaly detector 220 can include one or more hardware component shown in FIGS. 2A and 2B, including, e.g., one or more processors and memory.

In further detail, the anomaly detector 220 includes an interface 305. The interface 305 can include one or more components of computing device 200 shown in FIGS. 2A and 2B. For example, the interface 305 can include input/output ports, communication ports, or a network interface. In some embodiments, the interface 305 can be configured to generate or provide a user interface that allows a user, operator, or administrator of anomaly detector 220 to interact with the anomaly detector 220. The interface 305, via a graphical user interface, can receive input via buttons, input text boxes, pull-down menus, data files, batch upload processes, etc.

In some embodiments, the interface 305 is configured to receive meter observations from metering devices 118a-118n. The anomaly detector 220, using the interface 305, can identify a first indication of one or more signal samples used by the controller to adjust a voltage level at a load terminal during a first time interval, and a first indication of one or more voltage levels at the load terminal of the controller during the first time interval. The interface 305 can continuously receive samples from metering devices 118a-118n. The meter observations can be indicative of a utility (e.g., energy, electricity, gas, water, data, and bandwidth) delivered by a source (e.g., power source 101) to the plurality of consumer sites 119a-119n via a distribution point 114. For example, the meter observations can include voltage or current information associated with energy delivered or consumed at a consumer site 119. The meter observations may be associated with a time indication (e.g., a time stamp) and information that identifies the metering device and/or consumer site. For example, one or more metering observation may include a time stamp and an identifier of the metering device or consumer site. The one or more metering observations may further include types of data such as voltage, current, energy, power, capacitance, inductance, resistance, or other characteristics of energy or a power distribution circuit. In some embodiments, the metering devices 118a-118n may store the information or transmit the information to a computing device for further processing. In some embodiments, the metering devices transmit the information in real-time, such as a real-time data feed or streamlining. In some embodiments, the metering devices can periodically transmit the information to the computing device for further processing.

In some embodiments, the anomaly detector 220 includes a REM generator 310. The anomaly detector 220, via the REM generator 310, can identify a regulator emulation model ("REM") for the controller based on the first indication of the one or more signal samples and the first indication of the one or more voltage levels for the first time interval. The REM generator 310 can perform a learning process in a first operating state of the anomaly detector 220. The REM generator 310 can identify or learn parameters or settings of the voltage regulator controller 108's internal algorithm based on observed behavior. The REM generator 310 can be configured with one or more techniques to identify signal samples used by the voltage controller 108 to adjust a voltage level at a load terminal during a first time interval. The REM generator can also identify one or more voltage levels at the load terminal of the voltage controller 108 during the first time interval. The REM generator 310 uses the signals samples and voltage levels to identify a REM for the voltage controller 108.

The REM generator 310 can identify the REM using signals corresponding to signals the voltage controller 108 used during a first time interval in which there are no known anomalies or device defects. For example, the REM generator 310 can identify behavior metrics or an estimation of behavior metrics that lack anomalies, or behavior metrics from which anomalies are absent. This nominal behavior can be referred to as a reference behavior, a baseline behavior, an expected behavior, a desired behavior, or an ideal behavior. The reference behavior can represent behavior of the utility grid in the absence of an attack or the absence of malware affecting a digital computation device to cause an anomaly in behavior. Thus, prior to the anomaly detector 220 detecting an anomaly, the anomaly detector can establish behavior metrics that corresponds to a reference behavior or nominal behavior that does not contain an anomaly and use the behavior metrics to identify a mathematical procedure for formulating a REM of a process and estimating parameters associated with that REM using observations of the process behavior (e.g., signals). Thereafter, the anomaly detector 220 can receive a second indication of one or more signal samples used by the controller during a second time interval, and a second indication of a voltage level at the load terminal of the controller during the second time interval. The anomaly detector 220 can detect a level of conformance with the REM based on a comparison of the second indication of the voltage level with a modelled voltage level determined by inputting the second indication of the one or more signal samples into the REM established by the anomaly detector.

The REM generator 310 can detect tap setting changes using position information reported by the voltage regulator controller. A detection of a tap setting change using reported position information can be referred to as a T1 event trigger. In some cases, the REM generator 310 can detect tap setting changes using reported controlled voltage and a statistical technique for step location in time series. The REM generator 310 can use a two-stage estimate of regulator tap setting assertion delay which can include: 1) a coarse estimate by counting observed voltage samples meeting estimated criterion in time reverse; and 2) followed by a fine estimate using statistical method for voltage step location. The REM generator 310 can improve precision of "learned" parameter estimates on the basis of comparative variances of extant estimate and most recent example estimate.

The REM generator 310 can use trigger events to identify the REM. For example, the voltage controller 108 can assert tap setting changes if the relevant observed voltage crosses threshold values for time intervals (e.g., is greater than a first threshold for a duration of time). The REM generator 310 can detect and model both high and low voltage threshold crossings (e.g., a decrease or increase in tap settings). Detecting a tap change and then determining the voltage level that may have triggered the tap change can allow the REM generator 310 to determine the threshold as the voltage level that triggers tap change, and the REM generator 310 can use the determined threshold to generate the REM. Thus, the REM generator 310 can use the determined threshold as a parameter to model the behavior of the controller. Parameters used to model the controller can include voltage thresholds, timer values, a number of step increases or decreases, etc.

The REM generator 310 can be triggered to identify parameters of the REM responsive to the tap setting change. For example, a type T1 trigger can include the REM generator 310 detecting a tap setting change by a change in the tap setting position as reported by the voltage controller 108 to the supervisory system 130 or the anomaly detector 220. In another example, at type T2 trigger can include the REM generator 310 identifying a discrete change in a relevant voltage signal of a magnitude sufficient to indicate a possible tap setting change at the voltage controller 108. If the voltage controller 108 and its associated voltage-regulating transformer 106a are functioning nominally, triggers T1 and T2 can both occur, although they may be separated by a sample instance as recorded by the anomaly detector 220 due to the difference in sampling rates and the lack of consistent synchronism in the local and remote sampling processes.

Based on the two types of triggers (e.g., T1—the regulator control reports a change in the position of the tap setting mechanism; and T2—the regulator control reports no tap setting activity, instead, reporting of a possible tap setting change is determined by the presence of magnitude change in a series of samples of the relevant voltage time series), the REM generator 310 can apply a statistical edge estimator technique to the recorded voltage time series to estimate the position, magnitude, and variances of a step change in a voltage time series, and determine the sense of the change (e.g., increase or decrease). The statistical edge estimator technique can be configured to operate on a voltage time series that can include a random signal component.

The REM generator 310 can prepare or pre-process the signals prior to identifying the REM to emulate the behavior of the voltage regulator. For example, the REM generator 310 can be configured to emulate singular tap setting changes. Therefore, the REM generator 310 can pre-qualify buffered signals to facilitate correct operation. The REM generator 310 can pre-process or pre-qualify the signals by verifying that the buffered time series of the tap setting (e.g., position), as recorded by sampling this signal at the voltage controller 108, includes only one tap setting change event. In some cases, the REM generator 310 can separately utilize voltage time series information that includes no tap setting change events or more than one tap setting change events to provide classifiable information outside the emulation process.

In the pre-processing or pre-qualification step, the REM generator 310 can estimate the parameters of the tap change event model that characterize a single tap change event. These models emulate the tap change assertion behavior of the voltage controller 108, which may be characterized as delayed threshold response control. Since the tap setting changes in the voltage controller 108 affect the voltage observed at the device load terminals, the emulation of the tap setting decision process can treat the load terminal voltage as the selected relevant voltage, and proceed to emulate the tap setting change process as follows:

the magnitude of a selected voltage signal crossing a prescribed threshold starts a countdown timer, the latter having a prescribed time delay previously set;

the timer continues its countdown as long as the selected voltage remains beyond the prescribed threshold;

if the timer counts to zero, a tap change opposing the direction of the voltage threshold crossing is asserted by the control;

if the selected voltage retreats such that the prescribed threshold is not encroached, then the voltage regulator control can take one of two possible actions:

the countdown is terminated and the timer is reset, or the countdown is reversed, and the timer counts 'up' until either the prescribed time setting is reached, stopping the count 'up', or the selected voltage once again raises the threshold and begins the countdown from the current status of the timer, which may be less than the prescribed time setting.

In some cases, the signal samples, or indications thereof, received by the REM generator 310 may be a subset of the one or more signal samples used by the voltage controller 108 to adjust the voltage level at the load terminal during the first time interval. For example, the signal samples used by the voltage controller 108 during the first time interval may be sampled at a greater rate than the signal samples received by the anomaly detector 220. This may be due to limitations in network 140, bandwidth limitations, to reduce bandwidth consumption, delay, packet loss in the network, jitter, etc. To solve this technical problem, the anomaly detector 220 can apply an inferential technique to the received indications of the signal samples to generate the REM.

For example, the REM generator 310 can perform the following three operations, leveraging both prior knowledge of the algorithmic behavior of the subject voltage controller 108 and by the realization that external observation and sampling of the relevant signals by the REM generator 310 is both temporally coarser than, and asynchronous to, these signals as observed by the voltage controller 108.

a coarse estimate of the time delay setting obtained by emulation of the timing process in reverse, starting with the observed tap setting change and counting samples of the relevant voltage signal backward in time from this change, while accounting for the threshold behavior of the timer in the subject control;

a fine estimate, resolved to less than an external sampling interval, carried out using an adaptation of the statistical edge estimator procedure, improving the accuracy of the time delay estimate; and estimating the magnitude of the relevant voltage prior to the tap setting action by the voltage controller 108, and the magnitude of the change in the relevant voltage resulting from the tap setting action.

The REM generator 310 can also apply these techniques to analyze the voltage controller 108 source voltage, as this voltage may be subject to variation caused by influences exogenous to the voltage controller 108, and such variations may in turn be influential in tap setting decisions made by the voltage controller 108. The REM generator 310 can propagate the decision influence in this manner to facilitate detecting whether tap changes and voltage changes are expected or anomalous for all T2 tap event triggers (e.g., voltage controller 108 reports no tap setting activity, instead, reporting of a possible tap setting change is determined by the presence of magnitude change in a series of samples of the relevant voltage time series).

The primary level of the utility grid 100 can include digital computation devices or other components that are upstream of the secondary utilization circuit 116. For example, the primary level can include digital computation devices or components such as a distribution point 114, primary distribution circuit 112, voltage-regulating transformer 106a, regulator interface 110, voltage controller 108, substation 104, power source 101, or substation transmission bus, primary regulator controls, primary capacitor controls, protective relays on the primary level or other meters on the primary level. A secondary level can include components or digital computation devices that are downstream of the primary distribution circuit or level, such as consumer sites 119a-119n, potential transformers 120a-120n, or metering devices 118a-118n.

In some implementations, the model generator 310 can continuously monitor signals received from or via one or more digital computation devices, such as controllers or metering devices of the utility grid. The model generator 310 can monitor signals based on a predetermined time interval (e.g., every 1 second, 2 seconds, 3 seconds, 5 seconds, 10 seconds, 15 seconds, etc.). In some cases, the sampling time period can be less than or equal to 15 seconds, and the anomaly detector 220 can report a classification result based on a time interval of 1 to 5 minutes, for example. The model generator 310 can monitor signals in real-time (e.g., as digital computation devices determine or measure characteristics of or related to the utility grid and generate and provide a signal corresponding to the measured or determined characteristics). The monitored signals can indicate current or substantially current (e.g., within 5 minutes, within 10 minutes, within 30 minutes, within 3 hours, within 6 hours, within 12 hours, within 24 hours, within 48 hours, within 72 hours, or within some other time interval that facilitates monitoring the utility grid to detect an anomaly) behavior of the utility grid 100.

The model generator 310 can evaluate the REM to determine if the REM satisfactorily emulates the behavior of the voltage controller 108. For example, in the first operating state (or learning state), upon identifying the REM, and prior to using the REM to detect an anomaly, the REM generator 310 can determine whether the identified REM can satisfactorily emulate the behavior of the voltage regulator control. The REM generator 310 can determine whether the convergence criteria for acceptable estimates of the voltage controller's 108 hidden parameters are met. To do so, the REM generator 310 can obtain more instances of tap setting changes to learn the behavior. In this continued learning phase, the REM generator 310 can use T1 type tap event triggers to identify the REM. For example, the occurrence of T1 type tap event triggers can initiate the following processes:

- an analysis of the tap event;
- an update to the estimates of the hidden parameters; and
- a determination of the satisfactory convergence of these estimates.

The anomaly detector 220 can enter a second operating state (or 'critic state' or 'critic phase'), or upon determining that the convergence criteria for acceptable estimates of the voltage controller's 108 hidden parameters have been met, such that the identified REM can be used to examine tap event occurrences to determine the level of conformance with the learned, modelled behavior. For example, the anomaly detector 220 can include a comparator 315 designed and constructed to receive a second indication of one or more signal samples used by the voltage controller 108 during a second time interval, and a second indication of a voltage level at the load terminal of the voltage controller 108 during the second time interval. The comparator 315 can then detect a level of conformance with the REM based on a comparison of the second indication of the voltage level with a modelled voltage level determined by inputting the second indication of the one or more signal samples into the REM established by the REM generator 310. For example, in the critic phase, an occurrence of T1 type tap event trigger can initiate the following processes:

(i) an analysis of the tap event;
(ii) determination of the degree of conformance to the 'learned' expected behavior;
(iii) if (ii) is satisfactory, update of the learned parameters in the REM using the behavior of only those events determined to be in conformance, and report the occurrence of a 'nominal' event;
(iv) if (ii) is unsatisfactory, report the occurrence of an 'anomalous' event, and submit the analysis performed in (ii) to a classification process.

Thus, the comparator 315 can facilitate the REM generator 310 to continuously improve upon learned parameter estimates using features of observed tap setting actions and the associated relevant voltages. The anomaly detector 220 can discriminate between nominal and abnormal tap setting behavior of the voltage controller 108 after the initial "learning" process has concluded.

For example, in the third operating state (or "snoop" state or phase), the anomaly detector 220 (e.g., comparator 315) can snoop or monitor the voltage controller 108 to detect anomalous behavior. The comparator 315 can enter the third operating state (or 'snoop state' or 'snoop phase') upon the convergence criteria for acceptable estimates of the subject voltage controller's 108 hidden parameters having been met, such that the REM can be used to determine a level of conformance between observed tap event occurrences and the modelled behavior as learned by the anomaly detector in the first state. In some cases similar to the second operating state, the comparator 315 can receive subsequent indications of signal samples used by the voltage controller 108 and subsequent indications of voltage levels at the load terminal of the voltage controller 108. The comparator 315 can then detect a level of conformance with the REM based on a comparison of the subsequent indication of the voltage level with a modelled voltage level determined by inputting the subsequent indications of the signals into the REM established by the REM generator 310. The trigger event for the comparator in the third operating state can include T1 type triggers, where the voltage controller 108 reports a tap setting change, and it can also include T2 type triggers where the voltage controller 108 does not report tap setting activity, instead, the comparator 315 detects a possible tap setting change responsive to a step change in the magnitude change of a relevant voltage as indicated by the subsequent signals.

In some cases, to detect the anomaly, the comparator 315 can determine metrics based on the monitored signals, and compare these metrics of the monitored signals with the corresponding modelled metrics that do not contain anomalies.

Thus, since it is possible that a tap event could occur in the absence of an event trigger T1, the comparator 315 can be configured to perform, in the third operating state or 'snooping', a process including:

- identification of a tap event trigger (T2);
- (ii) application of the Statistical Edge Estimator edge identification process to the source voltage of the voltage controller 108;
- (iii) determination of the degree of conformance to the 'learned' expected behavior;
- (iv) if (iii) indicates that a voltage change event has occurred, proceed to (v);
- (v) if (iv) is satisfactory, report an event in the absence of tap event trigger (1), and submit the analysis performed in (iii) to a classifier 320 for a classification process;
- (vi) if (iv) is not satisfactory, report a voltage disturbance due to other causes, and submit the analyses performed in (ii) and (iii) to a classification process.

The anomaly detector 220 can include a classifier 320 designed and constructed to classify the anomaly or identify a cause of the anomaly. The classifier 320 can categorize detected anomalous voltage regulation events as (1) device defects—anomalies traceable to failures in the tap changing mechanism or to the tap setting feedback device(s); or (2) process defects—anomalies traceable to inconsistency between the relevant voltage signal and the tap setting response of the voltage regulator and its control. The classifier 320 can classify the detected anomalies into these or other categories. The classifier 320 can utilize information from the comparator 315 or REM generator 310 to classify the anomaly. For example, the anomaly detector 220 can use the REM to estimate the behavior and detect the anomaly, and then classify the anomaly as nominal (expected) or anomalous (unexpected or otherwise irregular). The classifier 320 can further determine possible causes and actionable remedies. The classifier 320 can classify the voltage regulation control events using the analyzed attributes of individual tap setting events and voltage change events, as well as sequential occurrences of two or more tap setting events and voltage change events.

Thus, the anomaly detector 220 can determine information about voltage regulation processors that allow regulation control events to be classified as nominal or anomalous, and further identify causes and remedies. For example, the determined information about the voltage regulation processes can include:

Pre-qualification of buffered signals
    number of tap setting changes as observed in tap position signal
        setting displacement for each tap setting change, observed on adjacent sample
        sample displacement (analogous to time difference) between tap setting changes
Critic emulation state
    full attributes for tap setting change
        prior load voltage magnitude, actual dwell delay, and load voltage change
        determination of tap setting event as nominal or anomalous
        variances of load voltage attributes
    measures of source voltage attributes
        source voltage change magnitude
        variance of source voltage prior/post
Snoop emulation state when (T2) trigger is observed
    complete 'Critic' analysis results
    sample displacement between source and load voltage changes where applicable Prior to enter Critic state, the anomaly detector 220 can be in learn mode. The learn mode, or learning state, can be similar to "Critic" state in that the process is T1 triggered, but the tap behavior REM parameters have not yet been established with suitable confidence to allow critique of new events ("Critic").

The anomaly detector 220 can classify the anomaly based on criteria corresponding to classes of anomalies. The classifier 320 can use the above criteria to classify the anomaly based on a classification table that maps criteria to a classification as shown in Table 1.

TABLE 1

Classification Map

| Observation | Instantiation | Classification |
| --- | --- | --- |
| Tap operation consistent with voltage process | Any | Nominal |
| Plural tap move when single tap move required | 1. Single instance<br>2. Plural, normal rate<br>3. Plural, accelerated | 1. Device defect<br>2. Device defect<br>3. Anomaly |
| Tap move wrong direction | Any | Anomaly |
| Emergency Tap, measurement confirmed | 1. Single instance<br>2. Plural | 1. Nominal<br>2. Anomaly |
| Fail to execute necessary tap move | Any | Device defect |
| Tap operations not required by voltage process | 1. Single instance<br>2. Plural, normal rate<br>3. Plural, accelerated | 1. Anomaly<br>2. Anomaly<br>3. Critical Anomaly |
| Tap position inconsistent with voltage responses | Any | Device defect |

By mapping the criteria from the operating states of the anomaly detector 220, the classifier 320 can identify a cause of the anomaly. The cause of the anomaly can further trigger a remedial action to mitigate the anomaly. For example, the classification "nominal" can refer to an expected operation where no action required. The classification "device defect" can indicate to take action that includes device inspection or maintenance action. The classification "anomaly" can indicate an unexpected or unsupported operation, and indicate to take an action that includes performing an investigation. The classification "critical anomaly" can indicate to take an action that includes performing an immediate mitigation because the device may be at risk.

In an illustrative example, the anomaly detector 220 may obtain signals indicating a voltage at the source of the voltage controller 108, and signals indicating a load voltage at the voltage controller 108. The anomaly detector 220 can determine based on the learned REM of the voltage controller 108 and the source voltage, that there should have been an increase in the tap setting to increase the load voltage. However, the anomaly detector 220 may determine that there was a decrease in the tap setting that resulted in a decreased load voltage. The anomaly detector 220 can detect this deviation from the learned REM, and further classify this deviation as an anomaly using the illustrative attribute-to-classification mapping in Table 1.

The Observation column in Table 1 can refer to a criteria determined by the anomaly detector 220 by comparing second indications of signals or voltage level with the REM. For example, the anomaly detector 220 can compare samples, signals, or voltage levels with the REM to observe a behavior of the controller as follows: a tap operation consistent with the voltage process modeled in the REM, plural or multiple tap moves when a single tap move is required (e.g., predicted or emulated) per the REM, a tap move in the wrong direction according to the REM, an emergency tap where the measurement is confirmed, a failure to execute a necessary (or predicted or emulated) tap move per the REM, a tap operation that is not required (or predicted or emulated) by the voltage process per the REM, or a tap position inconsistent with the voltage response per the REM.

The Instantiation column of Table 1 can refer to a criteria associated with the observation such as a number of occurrences of the observation or a rate of the observation. The anomaly detector 220 can map the observation to a classification based on the instantiation criteria. For example, if the anomaly detector 220 observed a tap operation consistent with the voltage process modeled in the REM, then the anomaly detector 220 can classify this as nominal behavior for any instantiation. However, if the anomaly detector 220 detects multiple tap moves when a single tap move is required per the REM, the anomaly detector 220 can then determine the instantiation value as one of single instance, plural instances with a normal rate, or plural instances at an accelerated rate. The normal rate and accelerated rate can be in relative to a nominal rate stored in the REM. The single or plural instances can refer to consecutive or back-to-back instances or instances within a predetermined time interval. If the anomaly detector 220 determines that the instantiation of the multiple tap moves when a single tap move is required is either a single instance or a plural instance with a normal rate, then the anomaly detector 220 can map the observation and instantiation to a classification of device defect. If the instantiation is plural with an accelerated rate (e.g., the anomaly detector 220 is observing the occurrences of multiple tap moves occurring faster or closer in time) then the anomaly detector 220 can classify the observation and instantiation as an anomaly.

The anomaly can include, for example, a cyber-attack, digital attack, electronic attack, physical attack, or other attack that can affect a digital computation device to cause an anomaly in a utility grid behavior, such as incorrect tap changes. In some cases, the malware can be installed on a device internal to the utility grid 100, an external device 330 or an external third party device 340 that can attack the controller or the metering device via a network to cause the anomaly. The attack can include malicious software (or malware) installed on a digital computation device, such as a controller or a metering device. The malware can be configured to cause the anomaly by manipulating an operation of the digital computation device, manipulating data received or provided by the digital computation device, disabling the digital computation device, or adjusting an operation parameter or threshold of the digital computation device. Malware can include viruses, hijacking software, bots, rootkit, worms, etc.

In some cases, the attack can include a physical attack where a digital computing device is physically manipulated, tampered with, or otherwise adjusted to cause an anomaly. For example, a sensor of a metering device can be blocked or prevented from accurately observing a characteristic of electricity or the environment such as voltage, temperature, or humidity. Thus, the metering device may report that the voltage has remained constant, even though the voltage controller 108 has instructed the regulator to increase the output voltage level. In some cases, the attack can be caused by equipment defect or malfunction due to, for example, partial failure of a digital computation device resulting in an unexpected operational characteristic.

The external third-party device 340 can be external to utility grid 100. The external device 330 can be external because it may not be originally designed to be part of the utility grid 100 by a utility grid operator. The external device 330 can include a computer, desktop computer, laptop, server or other computation device. The external third-party device 340 can include one or more component of system 200 or system 100. For example, the external third-party device 340 can include an interface designed and constructed to interface with one or more component or digital computation device of utility grid 100. The third-party device 340 can interface with a digital computation device of the utility grid 100 via network 140 such as the Internet or an Intranet. The third-party device 340 may directly interact or attack the digital computation without using the internet. For example, the third-party device 340 may be connected to a digital computation device via a direct wired or wireless connection (e.g., ZigBee, Bluetooth, or Near Field Communication). The third-party device 340 may attack or manipulate the digital computation device by sending fake commands, instructions, measurements, readings, etc. "Third party" may refer to an unauthorized actor or other entity that intends to attack the utility grid 100 or component thereof to cause the anomaly.

In some embodiments, the anomaly detector 220 includes a report generator 325 or report generator 325 designed and constructed to generate a report based on the detected anomalies. The report may identify anomalous or otherwise unexpected process behaviors, including measures and confidence of detection and likelihood of the presence of a malicious actor. The report generator 325 can report this information to a supervisory system 130 or other administer or operator of the utility grid or anomaly detector. The reports of such identified behaviors may include search advisory information useful to digital network traffic analysis systems. This information can be developed by analyzing the network connectivity of affected assets.

In some embodiments, the anomaly detector 220 can identify the digital computation device affected by an attack that caused the anomaly, and provide the identification of the affected digital computation device in the search advisory information. The anomaly detector 220, via REM generator 310 and comparator 315, can identify the origin of the signals under consideration (e.g., identify the digital computation device that provided a signal associated with an anomaly). For example, each signal can include or be an associated with an identifier of the voltage controller 108 corresponding to the signal. The identifier can identify the digital computation device that observed the signal, measured the signal, monitored the signal, generated the signal, or sent the signal. In some cases, the identifier can include multiple identifiers in which the signal is routed among multiple digital computation devices (e.g., via a mesh network). The identifier can also identify a location of the digital computation device, such as geographic coordinates (latitude, longitude), an address or other geographic marker.

Thus, the anomaly detector 220 can, responsive to monitoring signals received from digital computation devices and discriminating the signals to detect an anomaly, identify the one or more voltage controllers 108 corresponding to the one or more signals that triggered the detection of the anomaly. The anomaly detector 220 can, therefore, trace the anomalous to a digital computation device or other measuring instrument of the utility grid 100. The report generator 325 can provide an alert, report, indication or aspect thereof via push notifications, alerts, SMS messages, electronic mail, alarm, light, acoustic alarm, etc.

Figure 4:
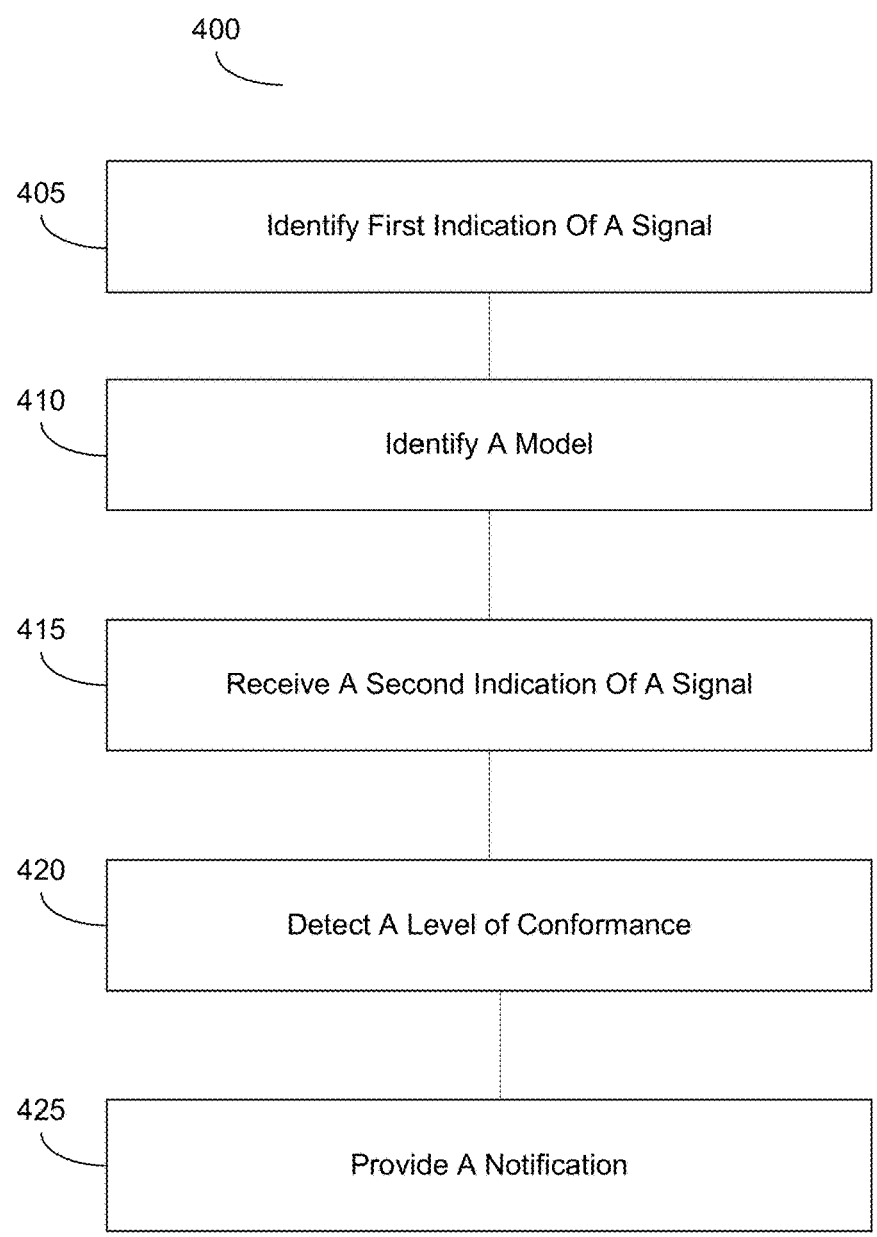
FIG. 4 is a flow chart depicting a method for detecting anomalies in a utility grid in accordance with an embodiment.

FIG. 4 is a flow chart depicting a method 400 for detecting anomalies in a utility grid in accordance with an embodiment. The method 400 can be performed by one or more component or system depicted in FIGS. 1, 2A, 2B and 3. For example, the method 400 can be performed by anomaly detector 220. In brief overview, at step 405, an anomaly detector identifies a first indication of a signal. At step 410, the anomaly detector identifies a REM. At step 415, the anomaly detector receives a second indication of a signal. At step 420, the anomaly detector can detect a level of conformance. At step 425, the anomaly detector can provide a notification.

Still referring to FIG. 4, and in further detail, an anomaly detector can identify a first indication of a signal at step 405. For example, the anomaly detector can identify a first indication of one or more signal samples used by the controller to adjust a voltage level at a load terminal of a voltage controller during a first time interval. The first indication of the one or more signal samples used by the controller to adjust the voltage level can refer to samples used by the controller to adjust a tap setting, such as an increase or decrease in tap settings. The anomaly detector can further identify a first indication of one or more voltage levels at the load terminal of the controller during the first time interval. This can refer to an actual voltage level at the terminal of the controller during the first time interval. The voltage information used to adjust the tap setting might be different from the current voltage level because the tap change may have resulted in a change to the voltage level. The anomaly detector can be remote from the voltage controller of the utility grid.

Signals can include, for example, metered observations or control information. The metered observations can be correspond to characteristics of electricity as observed at a metering device of a utility grid, a source voltage of a voltage controller, a load voltage of a voltage controller, or a regulator interface, for example. The metered observations can include information about a utility that is delivered, produced, consumed, or otherwise used. The information can include, e.g., characteristics of the utility. In an electrical grid, signals can indicate characteristics of electricity that are consumed or provided such as voltage, current, power, resistance, reactance, capacitance, inductance, real power. The characteristics of electricity may further refer to or correspond to points in the utility grid. For example, a real energy and reactive energy as metered on a distribution circuit at the primary level, or a real energy and reactive energy measured at the secondary distribution circuit.

The signals may correspond to a time series of measurements taken at a circuit in a distribution grid that is energized by at least one substation. The signals can include one or more of the following: primary voltages, one or more phases, secondary voltages, real energy and reactive energy as metered on the distribution circuit primary level; power or demand determined as the first time derivative of energy; real energy and reactive energy where applicable on secondary distribution; or temperature, humidity, cloud cover, or seasonal insolation for the affected area. In some cases, signals may include or refer to changes in supplied voltage (e.g., via adjusting tap settings) or changes in consumption.

In some cases, the first indication of the one or more signal samples received by the anomaly detector can be a subset of the one or more signal samples used by the controller to adjust the voltage level at the load terminal during the first time interval. For example, the one or more signal samples used by the voltage controller during the first time interval may be sampled at a greater rate than the first indication of the one or more signal samples received by the anomaly detector. Thus, the anomaly detector can apply an inferential technique to the first indication of the one or more signal samples used by the controller during the first time interval to generate the REM.

At step 410, the anomaly detector can identify an REM. The anomaly detector can identify the REM for the voltage controller based on the first indication of the one or more signal samples and the first indication of the one or more voltage levels for the first time interval. To establish the REM, the anomaly detector can detect a change in the voltage level at the load terminal during the first time interval as compared to the voltage level at the load terminal during the first time interval. The anomaly detector can use a statistical edge estimator procedure to the recorded voltage time series, to estimate the position, magnitude, and variances of a step change in a voltage time series, and determine the sense of the change (increase or decrease). The statistical edge estimator procedure can operate on signals forming a voltage time series that includes or can include a random signal component.

The anomaly detector can identify the step changes, either by applying then edge estimator technique to the first indication of the one or more voltage levels to detect the change or based on the controller reporting the change. By identifying the step changes and the source voltage of the voltage regulator that triggered the step change, the anomaly detector can set a threshold value for the REM based on the first indication of the one or more voltage levels. The threshold value can indicate a parameter or hidden parameter of the voltage controller that can be used to emulate the behavior of the voltage regulator.

At step 415, the anomaly detector can receive a second indication of a signal. The anomaly detector can receive the second indication of one or more signal samples used by the controller during a second time interval, and a second indication of a voltage level at the load terminal of the controller during the second time interval. For example, the second indication of the signal can include or indicate tap change information, a reported tap change, source voltage of the controller, or load voltage of the controller. The second indication can indicate a tap increase, for example, or tap decrease.

At step 420, the anomaly detector can detect a level of conformance. For example, the anomaly detector can detect a level of conformance with the REM based on a comparison of the second indication of the voltage level with a modelled voltage level determined by inputting the second indication of the one or more signal samples into the REM established by the anomaly detector.

In some cases, the anomaly detector can be in a learning process and update the REM. For example, the anomaly detector can detect a second level of conformance with the REM based on a second comparison of a third indication of one or more voltage levels with a second modelled voltage level determined by inputting a third indication of one or more signal samples into the REM established by the anomaly detector. The anomaly detector can then update the REM responsive to the second level of conformance greater than a threshold indicating convergence with the REM.

However, in a snooping phase, the anomaly detector can detect and classify anomalies. For example, the second indication of the one or more voltage levels can indicate an increase in the tap setting of the voltage controller or associated regulator interface. The anomaly detector can establish a duration of a countdown timer and a voltage threshold for the REM. The duration of the countdown timer and the voltage threshold can be established during the learning phase or the critic phase of the anomaly detector as the anomaly detector can identify these hidden parameters of the voltage controller during those phases.

The anomaly detector can use the REM to identify that the second indication of the one or more signal samples exceeds the voltage threshold for the REM. The anomaly detector can determine, based on the REM, that the modelled voltage level determined by inputting the second indication of the one or more signal samples into the REM established by the anomaly detector corresponds to a decrease in a tap setting. The anomaly detector can detect the level of conformance with the REM below a threshold based on the comparison of the second indication of the one or more voltage levels with the modelled voltage level determined based on the REM. For example, the level of conformance can be binary, such as "yes"/"no" or 0/1. The level of conformance can be a degree of conformance, such as low, medium, or high. The level of conformance can be on a scale or spectrum, such as from zero to ten, with zero being no conformance and ten being fully conforming, or vice versa.

In this example, the level of conformance can indicate "no" conformance because the detected tap increase is opposite to the modelled tap decrease. With this, the anomaly detector can classify the level of conformance using a classification table or mapping. For example, the level of conformance can be classified as an anomaly because it was an opposite tap change.

At step 425, the anomaly detector can provide, responsive to the level of conformance, a notification indicating an anomaly associated with the controller. The anomaly detector can further provide the classification of the anomaly with the notification of the anomaly. The anomaly detector can further trigger, provide, or instruct a remedial action based on the anomaly.

The anomaly detector can generate a report indicative of the identified anomaly. In some embodiments, the anomaly detector can generate a report that indicates that there is no anomaly. In some embodiments, the report may indicate a component or asset affected by malicious code. The report may include an identifier of the distribution grid, consumer site, substation, primary distribution circuit, distribution point, secondary utilization circuit, voltage controller, or other component or asset that may or may not be affected by a network intrusion. The anomaly detector can provide the report to a supervisory system that is configured to control, monitor, supervise, or otherwise manage the utility grid.

In some embodiments, the anomaly detector can generate an alert that includes a command or instruction to adjust an operating parameter of a digital computation device. For example, the anomaly detector can, responsive to detecting an anomaly, reset a metering device or controller to a predetermined state or configuration, provide a software patch to the controller or metering device, or disable the controller or metering device.

FIGS. 5-10 are flow charts depicting operations of a system for detecting anomalies in a utility grid, in accordance with some embodiments. The flow charts in FIGS. 5-10 can be used to perform one or more function of a component of system 300 depicted in FIG. 3, or a process or step of method 400 depicted in FIG. 4. For example, the anomaly detector 220 of system 300 can be configured based on the following pseudo code to perform operations as illustrated in FIGS. 5-10.

Figure 5:
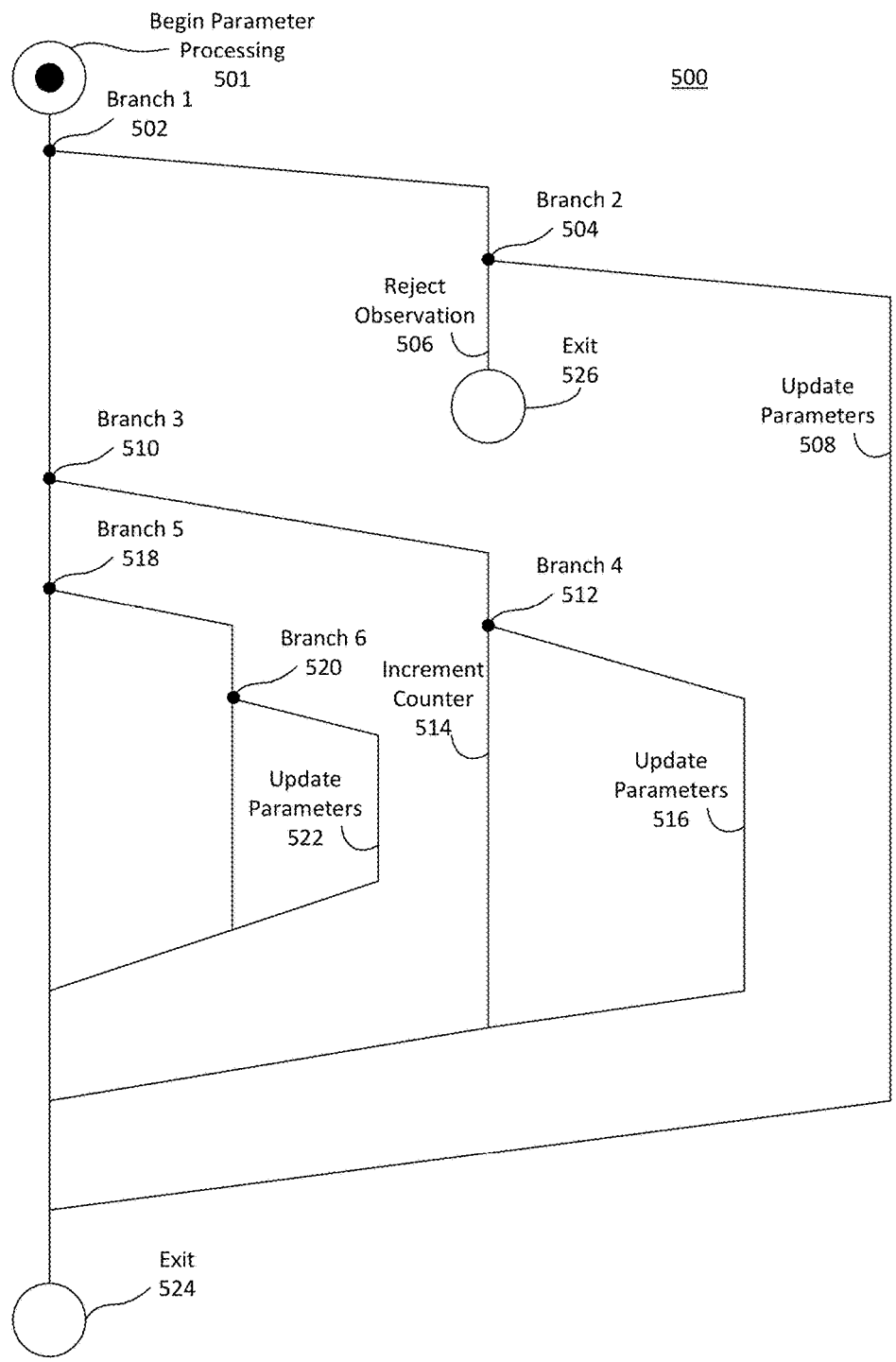
FIGS. 5-10 are flow charts depicting operations of a system for detecting anomalies in a utility grid, in accordance with some embodiments.

Referring now to FIG. 5, an operational flow chart for processing parameters to generate the REM in accordance with an embodiment is shown. The anomaly detector 220 can estimate parameters for processes or signals to generate the REM. The anomaly detector 220 can estimate the parameters based on repetitive observations. The effective use of these multiple observations for the estimation of a single representative set of REM parameters is facilitated by a determination of the quality of the observations, which may vary depending on the conditions present in the process subjected to modeling. Thus, the anomaly detector 220 can be configured with a systematic method for establishing the quality of the observations, and a method for combining these observations that assigns a greater influence on the REM parameter estimates to observations having higher quality.

An exemplary method for combining observations in this manner can include the corrector step in the predictor-corrector procedure. The anomaly detector 220 can apply the method in its scalar form for the estimation of a single parameter, as illustrated herein, or in its matrix form for the estimation of a parameter vector. The anomaly detector 220 can apply the method to successive observations as the estimation process is progressively exposed to new examples over time. The anomaly detector 220 can establish, define, obtain, compute, report or capture the following parameters to generate the REM:

| define | $p_{nom}$ | (specified, then estimated) the nominal value of the parameter estimate, initially set to the nominal value for the subject regulator, then set to the estimated parameter $p_{est}$ after the $p_{est}$ estimate has converged |
|---|---|---|
| define | $\Delta p_{min}$ | (specified) the upper bound of the change in the estimate of the parameter p between iterations that indicates convergence is pending |
| define | $p_{est}$ | (input) the prior parameter estimate based on cumulative observations |
| define | $p_{obs}$ | (input) the new parameter observation obtained from a new example |
| define | $p_{rev}$ | (return) the revised parameter estimate combining pest and $p_{obs}$ |
| define | $s_{min}$ | (specified) the minimum value of variance of the estimated parameter for which the main parameter update calculations are allowed to proceed |
| define | $s_{max}$ | (specified) the minimum value of variance of the estimated parameter for which the main parameter update calculations are allowed to proceed |
| define | $s_{est}$ | (input) the prior cumulative variance of the estimated parameter |
| define | $s_{obs}$ | (input) the variance of the parameter observation in the new example |
| define | $s_{rev}$ | (return) as the combined scale now including the new observation |
| obtain | | $p_{obs}$ and sobs by analysis of a new example (tap event) |
| compute | | $p_{rev} = (p_{est} * s_{obs} + p_{obs} * s_{est})/(s_{obs} + s_{est})$ |
| compute | | $s_{rev} = (s_{est} * s_{obs})/(s_{obs} + s_{est})$ |
| report | | $p_{rev}$ and $s_{rev}$ as the revised parameter estimate and cumulative variance |
| capture | | $p_{est} = p_{rev}$ (result) to be used as the parameter for the next iteration |
| capture | | $s_{est} = s_{rev}$ (result) to be used as the variance for the next iteration |

The anomaly detector 220 can determine that this iterative procedure has converged upon a suitable parameter estimate if prior to the 'capture' steps, the difference between $P_{est}$ and $p_{rev}$ is smaller than an acceptable limit or convergence threshold $\Delta p_{min}$ (e.g., less than or equal to 0.1% of the current $p_{est}$). In some cases, the anomaly detector 220 can determine convergence based on the occurrence of a predetermined number of instances (e.g., 3, 4, 5, 10, 15, 20, 30, 50 or more) of the ratio $s_{obs}/s_{est}$ less than a maximum convergence threshold (e.g., $\epsilon_p$, a ratio less than or equal to 0.1, 0.08, 0.06, 0.04, 0.02, or 0.01). Responsive to determining that the model has achieved convergence during the learning state, the anomaly detector 220 can proceed to a next state, such as critic or snoop.

For example, and as illustrated in operational flow 500 of FIG. 5, the parameter processing can begin at 501. The anomaly detector 220 can receive input parameters or data at step 501. At 502, the anomaly detector 220 enters a conditional branch. In conditional branch 502, the conditional statement is whether $s_{obs}=0$. If $s_{obs}=0$, then the conditional statement is true and the anomaly detector 220 proceeds to step 504. However, if $s_{obs}$ does not equal zero, then the anomaly detector proceeds to 510.

If $s_{obs}=0$ is true, the anomaly detector can proceed to step 504. At step 504, the anomaly detector 220 enters a second conditional branch. In this second conditional branch, the second conditional statement is whether $|p_{obs}-p_{nom}|<\Delta p_{min}$ is true. If the second conditional statement of branch 504 is true, then the anomaly detector 220 proceeds to operation 508. If this second conditional statement at 504 is false, then the anomaly detector proceeds to 506 and rejects the observation $S_{obs}$.

At 508, the anomaly detector can perform a procedure to update the parameter $s_{obs}=s_{min}$ responsive to $|p_{obs}-p_{nom}|<\Delta p_{min}$ being true. Updating the parameter in the procedure 508 can include computing $p_{rev}$ and setting $p_{est}$ equal to $p_{rev}$. The anomaly detector 220 can then proceed to 524 and exit 526 operation 500.

If the anomaly detector 220 determines that conditional branch at 502 is false, the anomaly detector proceeds to a third conditional branch 510. At the third conditional branch 510, the anomaly detector 220 processes a third conditional statement $s_{min}<S_{obs}<s_{max}$. If the third conditional statement of conditional branch 510 is true, the anomaly detector proceeds to a fourth conditional branch 512. At the fourth conditional branch 512, the anomaly detector 220 can process a fourth conditional statement $|p_{obs}/p_{est}-1|<\epsilon_p$. If the fourth conditional statement is true, the anomaly detector 220 proceeds to 516 and performs a procedure to update the parameters in the REM. Updating the parameter in the procedure 516 can include computing $p_{rev}$ and setting $p_{est}$ equal to $p_{rev}$. The anomaly detector 220 can proceed upon completion of procedure 516 to 524 and exit the operation 500.

If, however, the anomaly detector 220 determines at the fourth conditional branch 512 that the fourth conditional statement $|p_{obs}/p_{est}-1|<\epsilon_p$ is false, the anomaly detector 220 can proceed to procedure 514 in which the anomaly detector 220 does not update the parameter $p_{est}$ based on the computation of $p_{rev}$, and can increment a non-update counter. The anomaly detector 220 can then proceed to exit 524 operation 500.

If the anomaly detector 220 determines that the third conditional branch 510 is false, the anomaly detector 220 can proceed to a fifth conditional branch 518 instead of the fourth conditional branch 512. At the fifth conditional branch 518, the anomaly detector 220 can process a fifth conditional statement $S_{obs} \geq s_{max}$. If fifth conditional statement of conditional branch 518 is true, the anomaly detector 220 can proceed to a sixth conditional branch 520. At sixth conditional branch 520, the anomaly detector 220 can process a sixth conditional statement: Is $p_{obs}$ sensible? In this sixth conditional branch 520, the anomaly detector 220 can determine that $p_{obs}$ is sensible if $p_{obs}$ is consistent (e.g., within 1%, 2%, 5%, 10%, 15% or less) with the known physical limitations of the regulating transformer. If the sixth conditional statement 520 is true, the anomaly detector can proceed to perform procedure 522 to update the parameters in the REM, for example by computing $p_{rev}$ and setting $p_{est}$ equal to $p_{rev}$. The anomaly detector can then proceed to exit 524 operation 500.

If, however, conditional branch 520 is false, the anomaly detector 220 can skip updating the parameter and proceed to exit 524 the operation 500. Similarly, if the conditional branch 518 is false, the anomaly detector 220 can proceed to exit 524 the operation 500.

Thus, the anomaly detector 220 can be configured with operation 500 to identify and update parameters of the REM used by the anomaly detector 220 to emulate the behavior of the voltage controller 108 in order to detect and classify anomalies.

Figure 6:
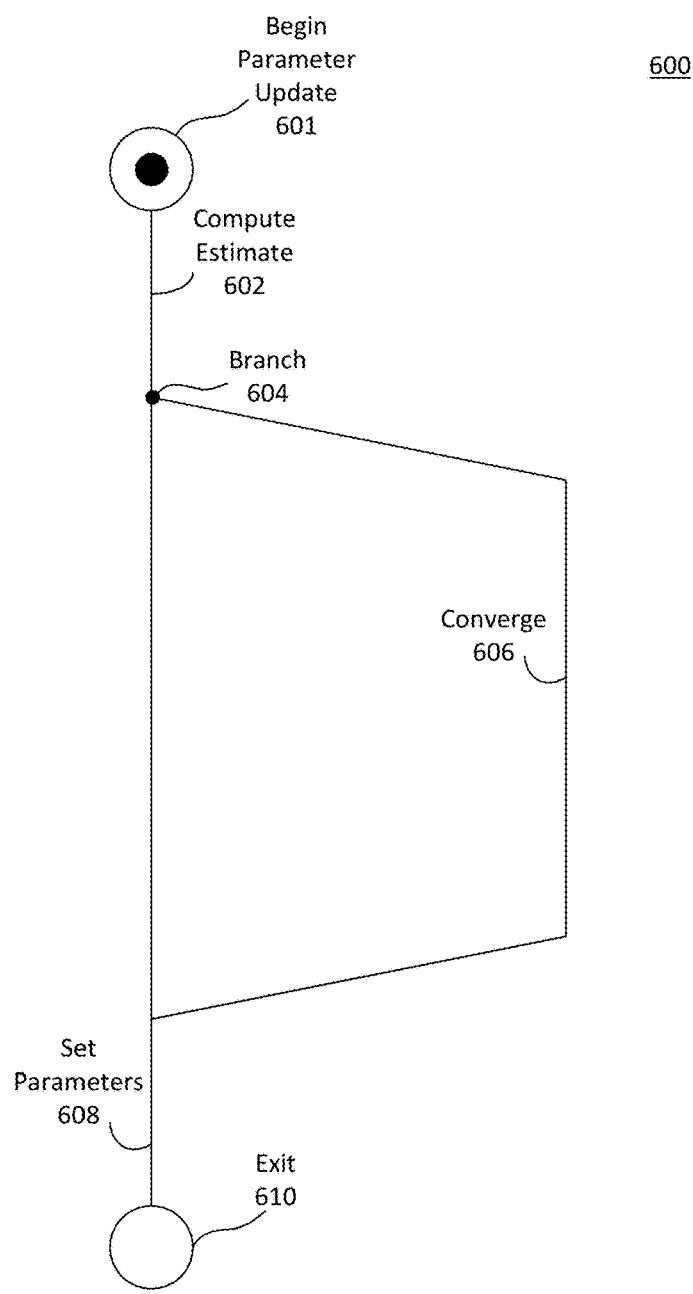

FIG. 6 illustrates an example operational flow 600 for updating the parameters of the REM. The anomaly detector 220 can be configured with operation 600 to perform the update parameter procedures 508, 516, 512, and 522 illustrated in FIG. 5. At 601, the anomaly detector 220 enters the operation 600 to update parameters of the REM. For example, the anomaly detector 220 can begin the parameter update at 601. At 602, the anomaly detector 220 performs a procedure to compute estimates for $s_{rev}$ and $P_{rev}$.

For example, $s_{rev}$ can be computed as follows:

$$s_{rev}=[s_{obs}^{-1}+s_{est}^{-1}]^{-1}$$

And $p_{rev}$ can be computed as follows:

$$p_{rev} = s_{rev} \cdot \left[\frac{p_{est}}{s_{est}} + \frac{p_{obs}}{s_{obs}}\right]$$

Figure 9:
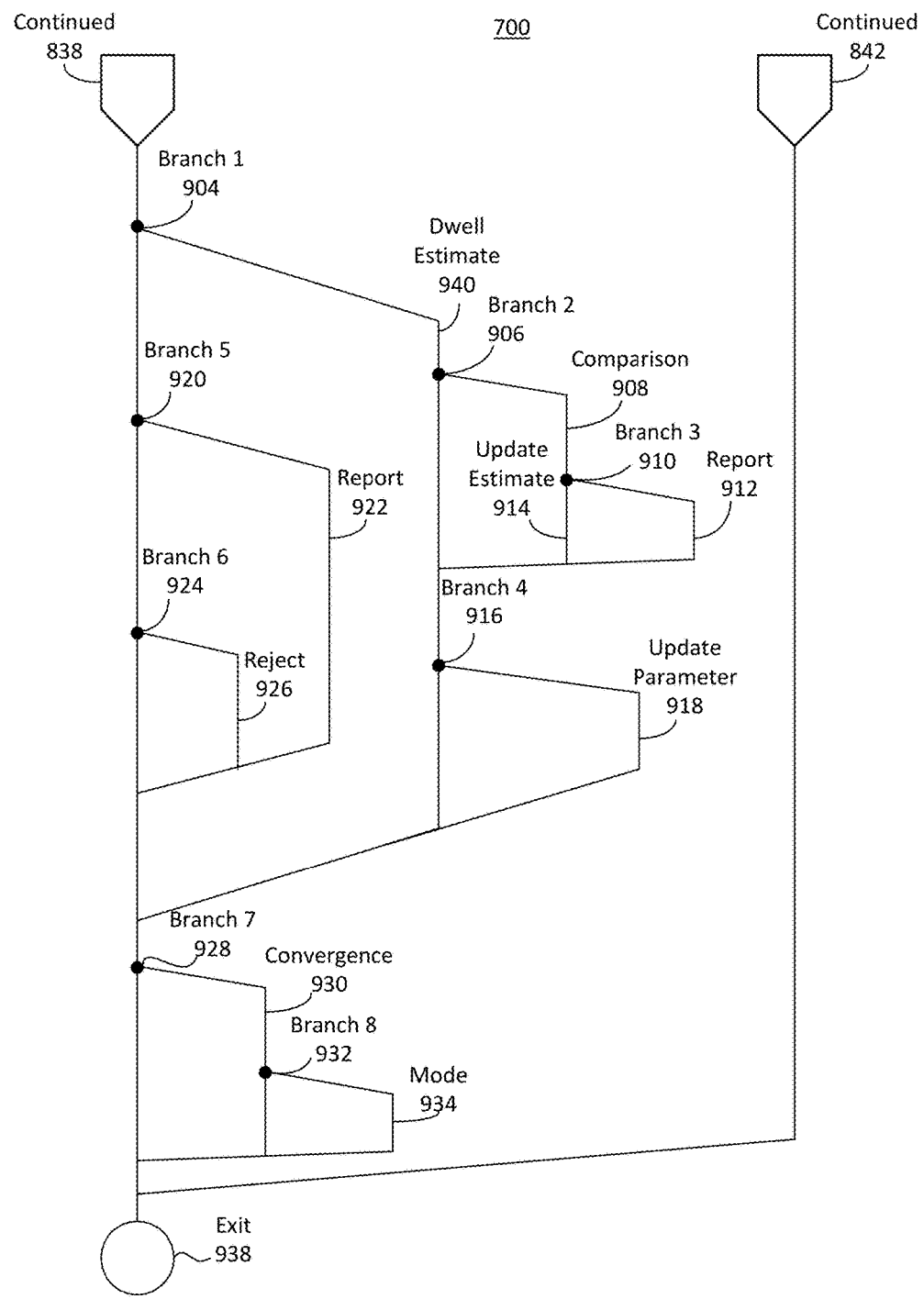
Figure 10:
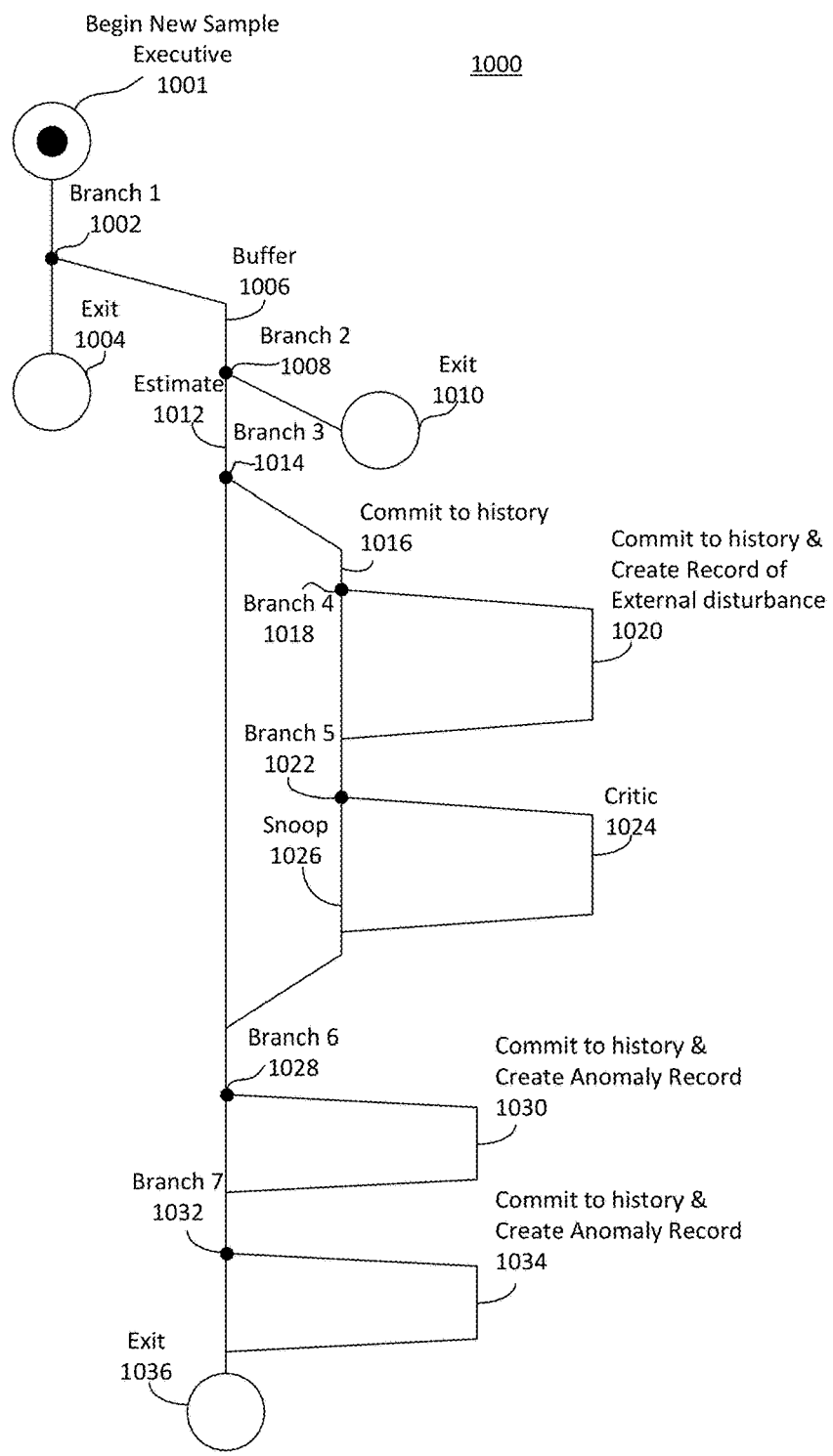

At conditional branch 604, the anomaly detector 220 can process the following conditional statement: $(|p_{rev}-p_{est}|<\Delta p_{min}$ AND $S_{obs}<s_{est})$. If the conditional statement for conditional branch 604 is true, then the anomaly detector proceeds to perform a convergence procedure 606, which includes procedures to determine whether the parameters for the REM have converged such that the anomaly detector 220 can enter the critic operating state, as illustrated in FIGS. 9-11. After performing the procedure 606, the anomaly detector proceeds to procedure 608 to set parameters. At procedure 608, the anomaly detector 220 can set $s_{est}=s_{rev}$, and set $p_{est}=p_{rev}$. The anomaly detector 220 can further reset the non-update counter to zero. The anomaly detector 220 can then proceed to exit 610 the operation 600. If, however, conditional branch 604 is false, the anomaly detector can by-pass procedure 606 and proceed directly to procedure 608 and exit 610.

Figure 7:
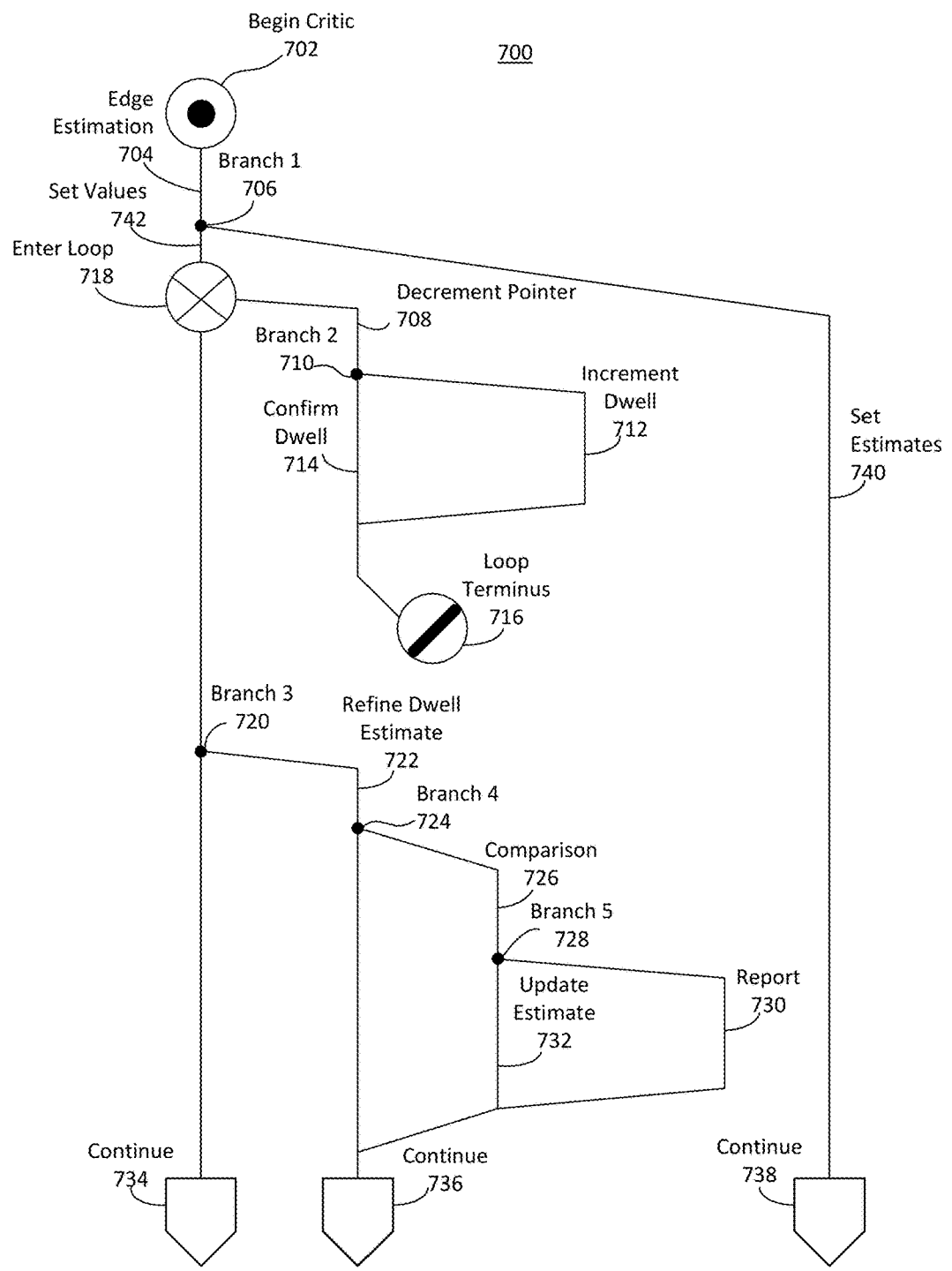

FIG. 7 illustrates an example operational flow 700 for critiquing the REM during the critic operating state of the anomaly detector 220. The anomaly detector 220 can be configured with operation 700 to critique the REM. At begin critic step 702, the anomaly detector 220 enters the critic operation 700. At edge estimation step 704, the anomaly detector 220 can perform one or more procedures prior to entering conditional branch 706. The procedures performed at 704 can include, for example, one or more of a statistical edge estimation technique and a determination as to a direction of change of a tap adjustment of the voltage controller 108. The anomaly detector 220 can apply the statistical edge estimation technique to a voltage time series to estimate the position, magnitude, and variances of a step change in the voltage time series, and determine the direction of the change (e.g., increase or decrease). The voltage time series on which the statistical edge estimation technique operates can include a random signal component. Accordingly, the anomaly detector 220 can be configured with a statistical edge estimation technique to operate on voltage time series that include the random signal component.

At first conditional branch 706, the anomaly detector 220 evaluates the conditional statement corresponding to conditional branch 706. The conditional statement at conditional branch 706 can include, for example, whether the change in direction of the tap setting detected during procedure 704 is the first example of a change in that direction. For example, if the change in direction detected at procedure 704 corresponds to an increase in the tap setting, and this is the first tap increase, then the anomaly detector 220 determines that the conditional statement for conditional branch 706 is true and proceeds to procedure set estimates 740. The anomaly detector 220 can determine that the conditional statement at conditional branch 706 is false if, for example, the previous detection of a change in a tap settings was also a tap increase. In another example, the anomaly detector 220 can determine that the conditional branch 706 is false if the anomaly detector 220 is detecting the second of two tap decreases.

If the conditional statement at the first conditional branch 706 is true, the anomaly detector 220 can proceed to set estimates procedure 740. Procedure 740 can include, for example, setting the estimates to example metrics. For example, the anomaly detector 220 can set $p_{est}$ equal to $p_{obs}$ and $s_{est}$ equal to $s_{obs}$. The anomaly detector 220 can then proceed to exit the procedure 700 at exit 938 depicted in FIG. 9 and via operation continuation blocks 738, 842, and 938 depicted in FIGS. 7, 8 and 9.

If the anomaly detector 220 determines that the conditional statement at the first conditional branch 706 is false, the anomaly detector 220 can proceed to set values procedure 742. The set values procedure 742 can include setting the $u_L$ of voltage k equal to $k_E$ and setting a type 1, or T1, dwell time to zero. The anomaly detector 220 can then proceed to enter loop 718. Loop 718 can include, for example, a while loop. The loop 718 conditional can be dwell pending AND samples remaining. For example, the anomaly detector 220 can perform the procedure or operations established for loop 718 while the conditional statement dwell pending AND samples remaining is true.

Upon entering loop 718, the anomaly detector 220 can perform procedure 708, which include decrementing the $u_L$ pointer. The anomaly detector 220 then proceeds to a second conditional branch 710. The anomaly detector 220 can evaluate conditional statement for the second conditional branch 710. The conditional statement at the second conditional branch 710 can include, for example, determining whether $u_L(k)$ is outside a voltage threshold. If $u_L(k)$ is outside a voltage threshold, then anomaly detector 220 proceeds to perform procedure 712, which can include incrementing the dwell time by one time interval $\Delta T$. If $u_L(k)$ is less than or equal to a voltage threshold, then anomaly detector can proceed to procedure 714, which can include confirming that the direction change corresponds to a type 1 dwell. The anomaly detector 220 can continue loop 718 for as long as the while statement for loop 718 remains true (e.g., while the dwell is pending and there are remaining samples). For example, the anomaly detector 220 can proceed to loop terminus 716 and then return to the loop entry point 718, at which the anomaly detector 220 can make the decision to either re-enter the loop or exit the loop and proceed to a third conditional branch 720. For example, if the dwell is no longer pending or there are no remaining samples, the anomaly detector 220 can exit loop 718 and proceed to the third conditional branch 720.

Upon exiting the loop 718, the anomaly detector 220 can continue the critic operation 700 by proceeding to the third conditional branch 720. At the third conditional branch 720, the anomaly detector 220 can evaluate a conditional statement as to whether allocated $u_L$ samples remain. If the anomaly detector 220 determines at the third conditional branch 720 that allocated $u_L$ samples remain, the anomaly detector can proceed to refine dwell estimate procedure 722, which can include procedures to refine dwell time estimates and record the type 1 dwell example. The anomaly detector 220 can then proceed to a fourth conditional branch 724. At the fourth conditional branch 724, the anomaly detector 220 can evaluate conditional statement to determine whether the operating state is critic mode. If the operating state is critic mode, then the anomaly detector proceeds to a comparison procedure 726. At the comparison procedure 726, the anomaly detector 220 can perform a procedure that includes comparing dwell examples against the estimates. If, at a fifth conditional branch 728, the anomaly detector 220 determines, responsive to evaluating a conditional statement, that the comparison determined at procedure 726 is unfavorable, then the anomaly detector 220 proceeds to report procedure 730, which can include reporting an inconsistent operation. If, however, at the fifth conditional branch 728, the anomaly detector 220 determines, responsive to evaluating the conditional statement, that the comparison determined at procedure 726 is favorable, then the anomaly detector 220 proceeds to update estimate procedure 732, which can include updating the estimates. The anomaly detector 220 can then proceed to continuity block 736. Also, if the operating state is not critic mode, as determined by the anomaly detector 220 at then fourth conditional branch 724, the anomaly detector 220 bypasses these procedures and proceeds directly to continuity block 736 after evaluating the conditional statement of the fourth conditional branch 724.

If the third conditional branch 720 is false, the anomaly detector 220 proceeds to continuity block 734.

Figure 8:
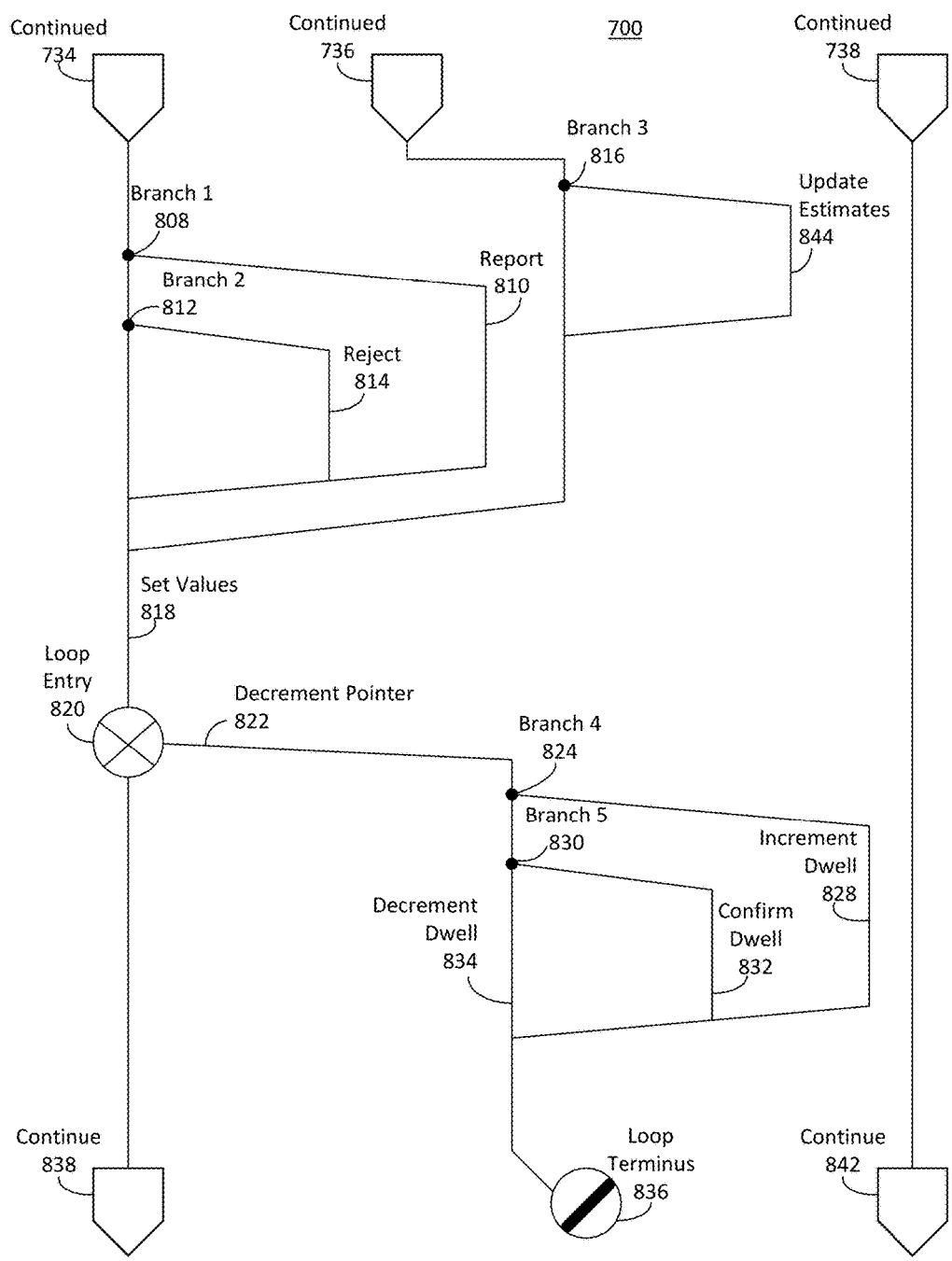

FIG. 8 illustrates a continuation of the operation 700 depicted in FIG. 7. From continuity block 734 depicted in FIG. 7, the anomaly detector 220 can proceed to a first conditional branch 808 depicted in FIG. 8. At the first conditional branch 808, the anomaly detector 220 can evaluate a conditional statement to determine whether to proceed to report procedure 810 or to a second conditional branch 812. The conditional statement at the first conditional branch 808 can include evaluating whether the anomaly detector 220 is in critic mode. If the anomaly detector 220 determines, at the first conditional branch 808, that the anomaly detector 220 is in critic mode, the anomaly detector 220 can proceed to perform the report procedure 810, which can include identifying a dwell error and reporting an anomaly.

If, at the first conditional branch 808, the anomaly detector 220 determines it is not in critic mode, the anomaly detector 220 proceeds to evaluate a conditional statement at the second conditional branch 812. The conditional statement at the second conditional branch 812 can include evaluating whether the anomaly detector 220 is in learn mode. If the anomaly detector 220 is in learn mode, as determined at the second conditional branch 812, the anomaly detector 220 can proceed to perform a reject procedure 814, which can include rejecting the example.

If the anomaly detector 220 is not in learn mode, as determined at the second conditional branch 812, the anomaly detector 220 proceeds to set values procedure 818, which can include setting the $u_L$ pointer to $k=k_E$, and setting the type 2 dwell time to zero. The anomaly detector 220 can also proceed to set values procedure 818 by bypassing the first and second conditional branches 808 and 812 if the anomaly detector 220 enters via continuity block 736. If the anomaly detector 220 enters via continuity block 736, the anomaly detector 220 can proceed to evaluate conditional statement at a third conditional branch 816, which can include determining whether the anomaly detector 220 is in learn mode or not in learn mode. If the anomaly detector 220 is in learn mode as determined at the third conditional branch 816, the anomaly detector 220 can proceed to update parameters procedure 844, which can include updating the estimates of the parameters. The anomaly detector 220 can then proceed to set values procedure 818, which can include setting the $u_L$ pointer to $k=k_E$, and setting the type 2 dwell time to zero.

Upon performing the set values procedure 818, the anomaly detector 220 can proceed to loop entry 820, which can include a while loop. The conditional statement for while loop 820 can include dwell time and samples remain. For example, the anomaly detector 220 can perform the operations or procedures prescribed in while loop 820 as long as the dwell is still pending and there are remaining samples. Upon entering loop 820, the anomaly detector 220 performs procedure 822, which can include decrementing the $U_L$ pointer. The anomaly detector 220 can then evaluate a conditional statement at a fourth conditional branch 824, which can include determining whether $u_L(k)$ is outside the voltage threshold. If $u_L(k)$ is outside the voltage threshold, as determined by the anomaly detector 220 at the fourth conditional branch 824, the anomaly detector 220 can proceed to procedure 828, which can include incrementing the dwell time by time interval $\Delta T$. The anomaly detector 220 can then proceed to loop terminus 836. The loop terminus 836 can cause the anomaly detector to return to enter loop 820 to determine if the while loop 820 conditional statement is true or false.

If, however, the anomaly detector 220 determines at the fourth conditional branch 824 that $u_L(k)$ is within (e.g., less than or equal to) the voltage threshold, the anomaly detector 220 can proceed to a fifth conditional branch 830. At the fifth conditional branch 830, the anomaly detector 220 can evaluate a conditional statement that includes determining whether a type 1 dwell has been reached. If the anomaly detector 220 determines that type 2 dwell has been reached, then the anomaly detector 220 can proceed to procedure 832, which can include confirming type 2 dwell, and then proceeding to loop terminus 836. If the anomaly detector 220 determines, at the fifth conditional branch 830, that type 2 dwell is not reached, then the anomaly detector 220 can proceed to procedure 834, which can include decrementing the dwell time by ΔT, and then proceed to loop terminus 836.

After loop terminus 836, the anomaly detector 220 can return back to the loop entry 820. If the conditions for loop entry 820 are true, the anomaly detector 220 can proceed to perform the operations or branches in loop 820. If, however, the conditions for loop entry 820 are false, the anomaly detector 220 can proceed to continuity block 838, which continues operation 700 as depicted in FIG. 9.

The anomaly detector 220 can enter a first conditional branch 904 depicted in FIG. 9 via continuity block 838 via FIG. 8. The anomaly detector 220 can evaluate a conditional statement of the first conditional branch 904. The conditional statement of the first conditional branch 904 can include determining whether any allocated $u_L$ samples are remaining. If the anomaly detector 220 determines that there are remaining allocated $u_L$ samples, then the anomaly detector 220 can proceed to a dwell estimate procedure 940. At procedure 940, the anomaly detector can refine the dwell estimate and record a type 2 dwell example.

Upon performing procedure 940, the anomaly detector 220 can proceed to a second conditional branch 906 at which the anomaly detector 220 can determine whether the anomaly detector 220 is in critic mode. If the anomaly detector 220 is in critic mode, then the anomaly detector 220 can proceed to a comparison procedure 908, at which the anomaly detector 220 can compare the dwell example with an estimate. Upon performing comparison procedure 908, the anomaly detector 220 can proceed to a third conditional branch 910, at which the anomaly detector 220 can determine whether the comparison of the dwell example against the estimate is favorable. If the comparison is unfavorable, then the anomaly detector 220 can proceed to procedure 912, at which the anomaly detector 220 can report the inconsistent operation. If, however, the comparison is favorable at the third conditional branch 910, the anomaly detector 220 proceeds to update estimate procedure 914, at which the anomaly detector 220 updates the estimates.

If the anomaly detector 220 is not in critic mode at the second conditional branch 906, the anomaly detector 220 can bypass the comparison procedure 908 and third conditional branch 910 and instead proceed to a fourth conditional branch 916. At the fourth conditional branch 916, the anomaly detector 220 determines whether the anomaly detector 220 is in learn mode. If the anomaly detector 220 is in learn mode, then the anomaly detector 220 proceeds to an update parameter procedure 918 at which the anomaly detector 220 can update the estimates (e.g., as depicted in FIG. 6). If the anomaly detector 220 is not in learn mode at the fourth conditional branch 916, the anomaly detector 220 bypasses procedure 918 and proceeds to a seventh conditional branch 928.

If, however, at the first conditional branch 904 the anomaly detector 220 determines that no allocated $u_L$ samples are remaining, then the anomaly detector 220 can bypass procedure 940 and conditional branches 906 and 916, and proceed to a fifth conditional branch 920 instead. At the fifth conditional branch 920, the anomaly detector 220 can evaluate the following conditional statement: critic mode? If the anomaly detector 220 is in critic mode at the fifth conditional branch 920, then the anomaly detector 220 can proceed to perform a report procedure 922, which can include identifying a dwell error and reporting an anomaly. If the anomaly detector 220 is not in critic mode at the fifth conditional branch 920, the anomaly detector 220 can instead proceed to a sixth conditional branch 924 to evaluate the following conditional statement: learn mode? If the anomaly detector 220 is in learn mode at the sixth conditional branch 924, the anomaly detector 220 can proceed to perform procedure 926, which can include rejecting the sample and then proceeding to the seventh conditional branch 928. If the anomaly detector 220 is not in learn mode at the sixth conditional branch 924, then the anomaly detector 220 can bypass the reject procedure 926 and proceed to the seventh conditional branch 928.

At the seventh conditional branch 928, the anomaly detector 220 can evaluate the following conditional statement: estimates learned criteria satisfied? If the anomaly detector 220 determines that the learned criteria of the estimates are satisfied, then the anomaly detector 220 proceeds to convergence procedure 930, which can include converging the estimates. The anomaly detector 220 can then proceed to an eighth conditional branch 932, which can include evaluating the following conditional statement: critic mode permission? If the anomaly detector 220 determines at the eighth conditional branch 932 that permission for critic mode has been granted, then the anomaly detector 220 can proceed to assert mode procedure 934, which can include asserting critic mode. If, however, the anomaly detector 220 determines at the seventh conditional branch 928 that the estimates of the learned criteria have not been satisfied, then the anomaly detector 220 can bypass the convergence procedure 930 and the eighth conditional branch 932 and proceed to exit procedure 700 at 938. If anomaly detector 220 determines at the eighth conditional branch 932 that the permission for critic mode has not been granted, then the anomaly detector 220 can proceed to exit 938.

FIG. 10 illustrates an example operational flow 1000 for processing a new sample. The new sample can refer to a new sample corresponding to a trigger event, such as a T1 trigger or T2 trigger. The anomaly detector 220 can execute the operation 1000 responsive to receiving a new sample responsive to a trigger event. The anomaly detector 220 can use the following pseudocode in conjunction with operation 1000 or to perform at least a part of operation 1000. In the following pseudo-code: text enclosed by square braces [text] can refer to a sub-procedure; text enclosed by braces {text} can refer to a logical test; and text enclosed by parentheses (text) can refer to a terminus. The anomaly detector 220 can capture signal measurements into first-in, first-out (FIFO) buffers for examination and analysis. The anomaly detector 220 can count the elements of the buffers from 0 (zero) as the most recently received measurement, to (N−1) as the oldest (or most delayed) measurement, where the length of the FIFO buffer is N elements.

The anomaly detector 220 can utilize the following signal notation outlined in Table 2 in conjunction with sample executive pseudocode or operation 1000:

TABLE 2

Example Signal Notation for New
Sample Executive pseudocode and Operation

| Signal Notation | Description |
| --- | --- |
| $u_S$ | voltage regulator source voltage signal, as measured by metering or control device, with attributes |
| $u_L$ | voltage regulator load voltage signal, as measured by metering or control device, with attributes |
| z | voltage regulator tap setting signal, as reported by control device, with attributes |
| $k_E$ | pointer to location of a tap setting event |
| $h_S$ | discrete event in regulator source voltage, attributes as described |
| $h_L$ | discrete event in regulator load voltage, attributes as described |
| $h_Z$ | change event in regulator tap setting, attributes as described |
| M | period, in samples, for examination of buffered signals |
| m | working sample counter |
| N | length of FIFO buffers |

The new sample executive pseudocode and operation 1000 can use the following signal attributes illustrated in Table 3.

TABLE 3

Example Signal Attributes for New Sample
Executive pseudocode and Operation

| Signal attributes | Description |
| --- | --- |
| u(k) | voltage signal observations, buffered as FIFO of specified length, where subscript L indicates a load voltage observation, and subscript S indicates a source voltage observation |
| x(k) | voltage signal integrity indicators, FIFO of length matching u(k) |
| z | regulator tap settings, FIFO of length matching u(k) |
| h(k) | signal event attributes, FIFO of length matching u(k), aligned in buffer with voltage observations u(k); buffered attributes can include: magnitude of the change associated with the event, and marker to indicate that event has been processed in real-time. |
| H( ) | cumulative historical record of signal events, which can include: time indicator, event magnitude, event examined for associations, associations (Boolean: prior event or posterior event). |

The anomaly detector 220 can estimate one or more parameters of a voltage controller 108. For example, the anomaly detector 220 can estimate the following parameters of a voltage controller 108 (or voltage regulator), as illustrated in Table 4.

TABLE 4

Example of Parameters of a Voltage
Controller Estimated by Anomaly Detector

| Estimated Voltage Controller Parameters | Description |
| --- | --- |
| $v_{MAX}$ | load voltage upper bound |
| $v_{MIN}$ | load voltage lower bound |
| $t_{TAP}$ | effective dwell time prior to tap setting change |

The following illustrative pseudocode can be used by anomaly detector 220 to process received new samples in accordance with operation 1000 illustrated in FIG. 10. Reference numbers <n> map the pseudocode to operation 1000 illustrated in FIG. 10.

The anomaly detector 220 can use the following pseudocode to estimate $h_z$ on new samples, where $h_z$ can refer to the first differences in the regulator tap setting signal z, which take on integer values only. This routine can operate on the most recent M measurements.

The anomaly detector 220 can use estimate $h_S$ or $h_L$ on new samples. The $h_S$ and $h_L$ can refer to the estimates of the presence of a voltage change consistent with a tap setting change of at least one position in the voltage-regulating transformer. The anomaly detector 220 can form the estimate by applying an edge detection procedure, followed by a thresholding step. The anomaly detector 220 can be configured with one or more techniques for the detection of edge features configured to operate along one axis (e.g., the sample axis corresponding to the sampled time series signals). Examples of edge detection techniques can include: difference operators, such as the three-sample central difference; unidirectional convolutions, such as the Sobel operator; linear-phase high pass filtering, applied as forward and reverse convolution in sequence; spectral methods suitable for short data vectors, such as the Gabor operator.

The anomaly detector 220 can perform thresholding to reject estimated edges of insufficient magnitude. Having located an edge satisfying the magnitude criterion, the anomaly detector 220 can create an instance of h(k), and negate the "processed" marker, indicating to the Received Sample Executive operation 1000 that this instance has not yet been examined.

Referring now to FIG. 10, the anomaly detector 220 can perform the new sample executive operation 1000. At 1001, the anomaly detector 220 begins the new sample executive operation 1000. At a first conditional branch 1002, the anomaly detector 220 can evaluate the following conditional statement: new sample received? If, at 1002, the anomaly detector 220 determines that a new sample has not been received, the anomaly detector 220 can proceed to exit 1004 the operation 1000.

If the anomaly detector 220 determines, at the first conditional branch 1002, that a new sample was received, the anomaly detector 200 can proceed to perform buffer procedure 1006, which can include fetching and buffering $U_S$, fetching and buffering $U_L$, fetching and buffering Z, and incrementing an evaluation counter. The anomaly detector 220 can then proceed to a second conditional branch 1008 at which the anomaly detector 220 can evaluate the following conditional statement: evaluation count not reached? If, at 1008, the anomaly detector 220 determines that the evaluation count has not been reached, the anomaly detector 220 can proceed to exit 1010 operation 1000. If, however, the anomaly detector 220 determines at the second conditional branch 1008 that the evaluation count has been reached, the anomaly detector 220 can proceed to perform estimate procedure 1012, which can include clearing the evaluation counter, estimating $h_S$, estimating $h_L$ and estimating $h_Z$.

Upon performing estimate procedure 1012, the anomaly detector 220 can then proceed to a third conditional branch 1014, at which the anomaly detector 220 can evaluate the following conditional statement: unexamined $h_L$ present? If the anomaly detector 220 determines, at 1014, that there are unexamined $h_L$, then the anomaly detector 220 can proceed to perform a commit procedure 1016, which can include committing $h_L$ to history. The anomaly detector 220 can then proceed to a fourth conditional branch 1018, at which the anomaly detector 220 can evaluate the following conditional statement: $h_S$ aligned with $h_L$? If the anomaly detector 220 determines, at 1018, that $h_S$ is aligned with $h_L$, then the anomaly detector 220 can proceed to perform commit procedure 1020, which can include committing $h_S$ and $h_L$ to history, and creating an external disturbance record. The anomaly detector 220 can proceed to a fifth conditional branch 1022 upon performing commit procedure 1020. In some cases, the anomaly detector 220 may bypass commit procedure 1020 and proceed to the fifth conditional branch 1022 if the anomaly detector 220 determines, at 1018, that $h_S$ is not aligned with $h_L$.

At the fifth conditional branch 1022, the anomaly detector 220 can evaluate the following conditional statement: $h_Z$ aligned with $h_L$? If the anomaly detector 220 determines that $h_Z$ is aligned with $h_L$, at 1022, then the anomaly detector 220 can proceed to perform a critic procedure 1024, which can include critiquing $h_Z(k_E)$. Upon performing critic procedure 1024, the anomaly detector 220 can proceed to a sixth conditional branch 1028. If, at the fifth conditional branch 1022, the anomaly detector 220 determines that $h_Z$ is not aligned with $h_L$, then the anomaly detector 1022 can bypass critic procedure 1024 and proceed to perform a snoop procedure 1026. Upon performing the snoop procedure 1026, the anomaly detector 220 can then proceed to a sixth conditional branch 1028.

If, at the third conditional branch 1014, the anomaly detector 220 determines that there are no unexamined $h_L$ present, then the anomaly detector 220 can bypass the commit procedure 1016 and fourth and fifth conditional branches 1018 and 1022, and proceed to the sixth conditional branch 1028.

At the sixth conditional branch 1028, the anomaly detector 220 can evaluate the following conditional statement: unexamined $h_S$ present? If the anomaly detector 220 determines that there are unexamined $h_S$ present, then the anomaly detector 220 can proceed to perform commit procedure 1030, which can include committing $h_S$ to history and creating an anomaly record of improper load. The anomaly detector 220 can proceed to a seventh conditional branch 1032 after performing the commit procedure 1030. If, however, the anomaly detector 220 determines that there are no $h_S$ present at the sixth conditional branch 1028, the anomaly detector 220 can bypass the commit procedure 1030 and proceed to a seventh conditional branch 1032.

At the seventh conditional branch 1032, the anomaly detector 220 can evaluate the following conditional statement: unexamined $h_Z$ present? If the anomaly detector 220 determines, at the seventh conditional branch 1032, that there are unexamined $h_Z$ present, then the anomaly detector 220 can proceed to perform a commit procedure 1034, which can include committing $h_Z$ to history and creating an anomaly recording indicating an unconfirmed move. Upon performing the commit procedure 1034, the anomaly detector 220 can proceed to exit 1036 operation 1000. If, however, the anomaly detector 220 determines at the seventh conditional branch 1032 that there are no unexamined $h_Z$ present, the anomaly detector 220 can bypass the commit procedure 1034, and proceed to exit 1036 procedure 1000.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "computation device" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, both special purpose microprocessors. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Although an example computing system has been described in FIG. 2A-2B, embodiments of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

While this specification contains many specific implementation details, these should not be construed as limitations on the scope of any subject matter or of what may be claimed, but rather as descriptions of features specific to particular embodiments. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the subject matter have been described. Other embodiments are within the scope of the following claims. While operations are depicted in the drawings in a particular order, this should not be understood as requiring that such operations be performed in the particular order shown or in sequential order, or that all illustrated operations are required to be performed. Actions described herein can be performed in a different order. In addition, the processes depicted in the accompanying figures do not necessarily require the particular order shown, or sequential order, to achieve desirable results. In certain embodiments, multitasking and parallel processing may be advantageous.

The separation of various system components does not require separation in all embodiments, and the described program components can be included in a single hardware or software product. For example, the REM generator 310 and the metric discriminator 315 can be a single module, a logic device having one or more processing circuits, or part of an online content item placement system.

Having now described some illustrative embodiments, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one embodiment are not intended to be excluded from a similar role in other embodiments.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate embodiments consisting of the items listed thereafter exclusively. In one embodiment, the systems and methods described herein consist of one, each combination of more than one, or all of the described elements, acts, or components.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements to single or plural configurations. References to any act or element being based on any information, act or element may include embodiments where the act or element is based at least in part on any information, act, or element.

Any embodiment disclosed herein may be combined with any other embodiment or embodiment, and references to "an embodiment," "some embodiments," "an alternate embodiment," "various embodiment," "one embodiment" or the like are not necessarily mutually exclusive and are intended to indicate that a particular feature, structure, or characteristic described in connection with the embodiment may be included in at least one embodiment or embodiment. Such terms as used herein are not necessarily all referring to the same embodiment. Any embodiment may be combined with any other embodiment, inclusively or exclusively, in any manner consistent with the aspects and embodiments disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of detecting an anomaly in a utility grid, comprising:
    identifying, by an anomaly detector executing on one or more processors remote from a controller of a utility grid, a first indication of one or more signal samples used by the controller to adjust a voltage level at a load terminal during a first time interval, and a first indication of one or more voltage levels at the load terminal of the controller during the first time interval;
    detecting, by the anomaly detector, a change in the voltage level at the load terminal during the first time interval as compared to a previous detection of the voltage level at the load terminal during the first time interval;
    identifying, by the anomaly detector, a regulator emulation model ("REM") for the controller based on the first indication of the one or more signal samples and the first indication of the one or more voltage levels for the first time interval;
    setting, by the anomaly detector and based on the change in the voltage level at the load terminal, a threshold value for the REM based on the first indication of the one or more voltage levels;
    receiving, by the anomaly detector, a second indication of one or more signal samples used by the controller during a second time interval, and a second indication of a voltage level at the load terminal of the controller during the second time interval;
    detecting, by the anomaly detector, a level of conformance with the REM based on a comparison of the second indication of the voltage level with a modelled voltage level determined by inputting the second indication of the one or more signal samples into the REM established by the anomaly detector; and
    providing, by the anomaly detector responsive to the level of conformance, a notification indicating an anomaly associated with the controller.

2. The method of claim 1, wherein the first indication of the one or more signal samples received by the anomaly detector are a subset of the one or more signal samples used by the controller to adjust the voltage level at the load terminal during the first time interval.

3. A method of detecting an anomaly in a utility grid, comprising:
    identifying, by an anomaly detector executing on one or more processors remote from a controller of a utility grid, a first indication of one or more signal samples used by the controller to adjust a voltage level at a load terminal during a first time interval, and a first indication of one or more voltage levels at the load terminal of the controller during the first time interval;
    identifying, by the anomaly detector, a regulator emulation model ("REM") for the controller based on the first indication of the one or more signal samples and the first indication of the one or more voltage levels for the first time interval;
    receiving, by the anomaly detector, a second indication of one or more signal samples used by the controller during a second time interval, and a second indication of a voltage level at the load terminal of the controller during the second time interval;
    detecting, by the anomaly detector, a level of conformance with the REM based on a comparison of the second indication of the voltage level with a modelled voltage level determined by inputting the second indication of the one or more signal samples into the REM established by the anomaly detector; and
    providing, by the anomaly detector responsive to the level of conformance, a notification indicating an anomaly associated with the controller,
    wherein the one or more signal samples used by the controller during the first time interval are sampled at a greater rate than the first indication of the one or more signal samples received by the anomaly detector.

4. The method of claim 1, comprising:
    applying, by the anomaly detector, an inferential technique to the first indication of the one or more signal samples used by the controller during the first time interval to generate the REM.

5. The method of claim 1, comprising:
    detecting the change in the voltage level based on a transmission received from the controller indicating a position change of a tap setting of the controller.

6. The method of claim 1, comprising:
    applying an edge estimator technique to the first indication of the one or more voltage levels during the first time interval to detect at least one of a position, a magnitude or a variance of the change in the voltage level.

7. The method of claim 1, comprising:
    detecting, by the anomaly detector, a second level of conformance with the REM based on a second comparison of a third indication of one or more voltage levels with a second modelled voltage level determined by inputting a third indication of one or more signal samples into the REM established by the anomaly detector; and updating, by the anomaly detector responsive to the second level of conformance greater than a threshold indicating convergence with the REM, the REM.

8. The method of claim 1, wherein the second indication of the one or more voltage levels indicates an increase in a tap setting of the controller, the method comprising:

establishing, by the anomaly detector, a duration of a countdown timer and a voltage threshold for the REM;

identifying that the second indication of the one or more signal samples exceeds the voltage threshold for the REM;

determining, based on the REM, that the modelled voltage level determined by inputting the second indication of the one or more signal samples into the REM established by the anomaly detector corresponds to a decrease in the tap setting; and detecting, by the anomaly detector, the level of conformance with the REM below a threshold based on the comparison of the second indication of the one or more voltage levels with the modelled voltage level determined based on the REM.

9. The method of claim 1, comprising:

classifying the anomaly based on criteria corresponding to classes of anomalies; and providing a classification of the anomaly with the notification of the anomaly.

10. A system to detect an anomaly in a utility grid, comprising:

an anomaly detector executing on one or more processors remote from a controller of a utility grid;

the anomaly detector configured to:

identify a first indication of one or more signal samples used by the controller to adjust a voltage level at a load terminal during a first time interval, and a first indication of one or more voltage levels at the load terminal of the controller during the first time interval;

detect a change in the voltage level at the load terminal during the first time interval as compared to a previous detection of the voltage level at the load terminal during the first time interval;

identify a regulator emulation model ("REM") for the controller based on the first indication of the one or more signal samples and the first indication of the one or more voltage levels for the first time interval;

set, based on the change in the voltage level at the load terminal, a threshold value for the REM based on the first indication of the one or more voltage levels;

receive a second indication of one or more signal samples used by the controller during a second time interval, and a second indication of a voltage level at the load terminal of the controller during the second time interval;

detect a level of conformance with the REM based on a comparison of the second indication of the voltage level with a modelled voltage level determined by inputting the second indication of the one or more signal samples into the REM established by the anomaly detector; and provide, responsive to the level of conformance, a notification indicating an anomaly associated with the controller.

11. The system of claim 10, wherein the first indication of the one or more signal samples received by the anomaly detector are a subset of the one or more signal samples used by the controller to adjust the voltage level at the load terminal during the first time interval.

12. A system to detect an anomaly in a utility grid, comprising:

an anomaly detector executing on one or more processors remote from a controller of a utility grid;

the anomaly detector configured to:

identify a first indication of one or more signal samples used by the controller to adjust a voltage level at a load terminal during a first time interval, and a first indication of one or more voltage levels at the load terminal of the controller during the first time interval;

identify a regulator emulation model ("REM") for the controller based on the first indication of the one or more signal samples and the first indication of the one or more voltage levels for the first time interval;

receive a second indication of one or more signal samples used by the controller during a second time interval, and a second indication of a voltage level at the load terminal of the controller during the second time interval;

detect a level of conformance with the REM based on a comparison of the second indication of the voltage level with a modelled voltage level determined by inputting the second indication of the one or more signal samples into the REM established by the anomaly detector; and provide, responsive to the level of conformance, a notification indicating an anomaly associated with the controller, wherein the one or more signal samples used by the controller during the first time interval are sampled at a greater rate than the first indication of the one or more signal samples received by the anomaly detector.

13. The system of claim 10, wherein the anomaly detector is configured to:

apply an inferential technique to the first indication of the one or more signal samples used by the controller during the first time interval to generate the REM.

14. The system of claim 10, wherein the anomaly detector is configured to:

detect the change in the voltage level based on a transmission received from the controller indicating a position change of a tap setting of the controller.

15. The system of claim 10, wherein the anomaly detector is configured to:

apply an edge estimator technique to the first indication of the one or more voltage levels during the first time interval to detect at least one of a position, a magnitude or a variance of the change in the voltage level.

16. The system of claim 10, wherein the anomaly detector is configured to detect a second level of conformance with the REM based on a second comparison of a third indication of one or more voltage levels with a second voltage level determined by inputting a third indication of one or more signal samples into the REM established by the anomaly detector; and update, responsive to the second level of conformance greater than a threshold indicating convergence with the REM, the REM.

17. The system of claim 10, wherein the second indication of the one or more voltage levels indicates an increase in a tap setting of the controller, and the anomaly detector is further configured to:

establish a duration of a countdown timer and a voltage threshold for the REM;

identify that the second indication of the one or more signal samples exceeds the voltage threshold for the REM;

determine, based on the REM, that the modelled voltage level determined by inputting the second indication of the one or more signal samples into the REM established by the anomaly detector corresponds to a decrease in the tap setting; and detect the level of conformance with the REM below a threshold based on the comparison of the second indication of the one or more voltage levels with the modelled voltage level determined based on the REM.

18. The system of claim 10, wherein the anomaly detector is configured to:

classify the anomaly based on criteria corresponding to classes of anomalies; and provide a classification of the anomaly with the notification of the anomaly.

19. The method of claim 3, wherein the first indication of the one or more signal samples received by the anomaly detector are a subset of the one or more signal samples used by the controller to adjust the voltage level at the load terminal during the first time interval.

20. The method of claim 3, comprising:

applying, by the anomaly detector, an inferential technique to the first indication of the one or more signal samples used by the controller during the first time interval to generate the REM.

21. The method of claim 3, comprising:

detecting, by the anomaly detector, a change in the voltage level at the load terminal during the first time interval as compared to the voltage level at the load terminal during the first time interval; and setting, by the anomaly detector, a threshold value for the REM based on the first indication of the one or more voltage levels.

22. The method of claim 3, comprising:

detecting, by the anomaly detector, a second level of conformance with the REM based on a second comparison of a third indication of one or more voltage levels with a second modelled voltage level determined by inputting a third indication of one or more signal samples into the REM established by the anomaly detector; and updating, by the anomaly detector responsive to the second level of conformance greater than a threshold indicating convergence with the REM, the REM.

23. The method of claim 3, wherein the second indication of the one or more voltage levels indicates an increase in a tap setting of the controller, the method comprising:

establishing, by the anomaly detector, a duration of a countdown timer and a voltage threshold for the REM;

identifying that the second indication of the one or more signal samples exceeds the voltage threshold for the REM;

determining, based on the REM, that the modelled voltage level determined by inputting the second indication of the one or more signal samples into the REM established by the anomaly detector corresponds to a decrease in the tap setting; and detecting, by the anomaly detector, the level of conformance with the REM below a threshold based on the comparison of the second indication of the one or more voltage levels with the modelled voltage level determined based on the REM.

24. The method of claim 3, comprising:

classifying the anomaly based on criteria corresponding to classes of anomalies; and providing a classification of the anomaly with the notification of the anomaly.

25. The system of claim 12, wherein the first indication of the one or more signal samples received by the anomaly detector are a subset of the one or more signal samples used by the controller to adjust the voltage level at the load terminal during the first time interval.

26. The system of claim 12, wherein the anomaly detector is configured to:

apply an inferential technique to the first indication of the one or more signal samples used by the controller during the first time interval to generate the REM.

27. The system of claim 12, wherein the anomaly detector is configured to:

detect a change in the voltage level at the load terminal during the first time interval as compared to the voltage level at the load terminal during the first time interval; and set a threshold value for the REM based on the first indication of the one or more voltage levels.

28. The system of claim 12, wherein the anomaly detector is configured to:

detect a second level of conformance with the REM based on a second comparison of a third indication of one or more voltage levels with a second modelled voltage level determined by inputting a third indication of one or more signal samples into the REM established by the anomaly detector; and update, responsive to the second level of conformance greater than a threshold indicating convergence with the REM, the REM.

29. The system of claim 12, wherein the second indication of the one or more voltage levels indicates an increase in a tap setting of the controller, and the anomaly detector is configured to:

establish a duration of a countdown timer and a voltage threshold for the REM;

identify that the second indication of the one or more signal samples exceeds the voltage threshold for the REM;

determine, based on the REM, that the modelled voltage level determined by inputting the second indication of the one or more signal samples into the REM established by the anomaly detector corresponds to a decrease in the tap setting; and detect the level of conformance with the REM below a threshold based on the comparison of the second indication of the one or more voltage levels with the modelled voltage level determined based on the REM.

30. The system of claim 12, wherein the anomaly detector is configured to:

classify the anomaly based on criteria corresponding to classes of anomalies; and provide a classification of the anomaly with the notification of the anomaly.

* * * * *